United States Patent
He et al.

(10) Patent No.: US 12,470,553 B2
(45) Date of Patent: Nov. 11, 2025

(54) ACCESS MANAGEMENT METHOD, AUTHENTICATOR, AND AUTHENTICATION SERVER

(71) Applicant: HUAWEI TECHNOLOGIES CO., LTD., Guangdong (CN)

(72) Inventors: Bin He, Dongguan (CN); Cairen Weng, Nanjing (CN); Yibin Xu, Nanjing (CN); Sisheng Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 212 days.

(21) Appl. No.: 18/170,806

(22) Filed: Feb. 17, 2023

(65) Prior Publication Data

US 2023/0208836 A1 Jun. 29, 2023

Related U.S. Application Data

(63) Continuation of application No. PCT/CN2021/106155, filed on Jul. 14, 2021.

(30) Foreign Application Priority Data

Aug. 20, 2020 (CN) .......................... 202010842714.2
Sep. 25, 2020 (CN) .......................... 202011027414.5

(51) Int. Cl.
    *H04L 9/40* (2022.01)
(52) U.S. Cl.
    CPC ........ *H04L 63/0876* (2013.01); *H04L 63/102* (2013.01); *H04L 63/20* (2013.01)
(58) Field of Classification Search
    CPC ... H04L 63/0876; H04L 63/102; H04L 63/20; H04L 63/0236; H04L 63/164;
    (Continued)

(56) References Cited

U.S. PATENT DOCUMENTS

| 9,756,052 B2 * | 9/2017 | Lin | H04L 63/20 |
| 2010/0107223 A1 * | 4/2010 | Zheng | H04L 63/08 726/3 |

(Continued)

FOREIGN PATENT DOCUMENTS

| CN | 103229488 A | 7/2013 |
| CN | 102771149 B | 9/2015 |

(Continued)

OTHER PUBLICATIONS

T. Narten et al:"Privacy Extensions for Stateless Address Autoconfiguration in IPV6".Request for Comments: 4941, Sep. 2007, total 23 pages.

*Primary Examiner* — Han Yang
(74) *Attorney, Agent, or Firm* — WOMBLE BOND DICKINSON (US) LLP

(57) ABSTRACT

This application discloses an access management method, an authenticator, and an authentication server, applied to a scenario in which a terminal device accesses a network. After completing authentication, a terminal device sends a first packet to an authenticator, where the first packet carries a first IPV6 address of the terminal device and a MAC address of the terminal device. When determining that the first IPV6 address is a new IPV6 address, the authenticator sends, to an authentication server, a second packet carrying the first IPV6 address and the MAC address, so as to indicate the authentication server to send a first authorization policy to a policy enforcement point based on the first IPV6 address.

18 Claims, 12 Drawing Sheets

(58) Field of Classification Search
CPC . H04L 61/503; H04L 61/5092; H04L 61/103; H04L 61/5053; H04L 2101/622; H04L 2101/659; H04W 12/06; H04W 12/088
See application file for complete search history.

(56) References Cited

U.S. PATENT DOCUMENTS

2014/0344444 A1* 11/2014 Wu ............... H04L 61/5014
709/224
2015/0237003 A1* 8/2015 Ghai ............... H04L 61/503
709/220

FOREIGN PATENT DOCUMENTS

| CN | 104955025 B | 11/2018 |
|----|-------------|---------|
| CN | 110022383 A | 7/2019 |

* cited by examiner

ACCESS MANAGEMENT METHOD, AUTHENTICATOR, AND AUTHENTICATION SERVER

CROSS-REFERENCE TO RELATED APPLICATIONS

This application is a continuation of International Application No. PCT/CN2021/106155, filed on Jul. 14, 2021, which claims priority to Chinese Patent Application No. 202011027414.5, filed on Sep. 25, 2020, which claims priority to Chinese Patent Application No. 202010842714.2, filed on Aug. 20, 2020. All of the aforementioned patent applications are hereby incorporated by reference in their entireties.

TECHNICAL FIELD

Embodiments of this application relates to the field of data communication, and in particular, to an access management method, an authenticator, and an authentication server.

BACKGROUND

A global unicast address (GUA) is a unicast address that is defined in the internet protocol version 6 (IPv6) protocol and that uniquely identifies a user accessing a network. When a terminal uses a stable IPV6 GUA to access an Internet application, the terminal may be specifically eavesdropped, causing a network security risk. In this case, a temporaryIPV6 GUA (referred to as a temporary IPV6 address below) is further defined. When a user uses a temporary IPV6 address to access a network, the temporary IPV6 address changes along with time, so that a user address is unpredictable. The use of the temporary IPV6 address by the terminal device improves communication privacy, but also brings new operations and maintenance problems. For example, changes of the temporary IPV6 address cause a problem that a network side cannot control, based on an updated temporary IPV6 address, the terminal device to access a network or configure an authorization policy for the terminal device. Therefore, access of the terminal device to a service application is interrupted.

Therefore, it is an urgent problem to seek a solution that can ensure that a service is not interrupted as much as possible when the temporary IPV6 address changes.

SUMMARY

Embodiments of this application provide an access management method, an authenticator, and an authentication server, so as to effectively reduce a service interruption possibility of a terminal device when a temporary IPV6 address changes, and ensure normal running of a service as much as possible.

According to a first aspect, an access management method is provided. The method is applied to a scenario in which a terminal device accesses a network (for example, a campus network). In the method, the terminal device first performs access authentication, and an authentication procedure may be based on the 802.1x protocol or the Portal protocol. Then, an authenticator may receive a first packet from the terminal device. The first packet carries a first IPV6 address of the terminal device and a media access control (MAC) address of the terminal device. The first IPV6 address is a new temporary IPV6 address of the terminal device. It may also be understood as that the first IPV6 address is a temporary IPV6 address newly generated by the terminal device. Then, when the authenticator determines that the first IPV6 address is a new IPV6 address, the authenticator sends a second packet to the authentication server, where the second packet carries the first IPV6 address and the MAC address, the authentication server sends a first authorization policy to a policy enforcement point based on the first IPV6 address, and the first authorization policy is an authorization policy related to the first IPV6 address.

It should be understood that the first packet may be directly sent by the terminal device to the authenticator, or may be sent by the authenticator to an access point, and then sent by the access point to the authenticator. This is not specifically limited herein. In an optional implementation, the access point is a Layer 2 switch. In an optional implementation, the authenticator is a switch, a router, or a firewall. In an optional implementation, the policy enforcement point is a switch, a router, or a firewall. In an optional implementation, that the policy enforcement point is the authenticator may also be understood as: The authenticator and the policy enforcement point are a same apparatus.

When receiving the first packet that is from the terminal device and that carries the first IPV6 address and the MAC address, the authenticator sends the first IPV6 address and the MAC address to the authentication server when determining that the first IPV6 address is a new IPV6 address. Then, the authentication server determines, based on the first IPV6 address, the first authorization policy sent to the policy enforcement point (for example, a gateway). The first authorization policy sent by the authentication server is determined based on the first IPV6 address (that is, the new IPV6 address). Therefore, after the policy enforcement point receives the first authorization policy, a service packet of the terminal device from the first IPV6 address (which may also be understood as that a source address of the first packet is the first IPV6 address) can be transmitted, through the policy enforcement point, to an address or a network segment that allows a user using the terminal device to access. Therefore, even if the IPV6 address of the terminal device changes, the service is not interrupted.

In an optional implementation, before receiving the first packet, the authenticator does not store a correspondence between the MAC address and the first IPV6 address. It may also be understood as that after the authenticator receives the first packet, when the authenticator determines that the correspondence between the MAC address and the first IPV6 address is not stored in the authenticator, the authenticator determines that the first IPV6 address is a new IPV6 address.

In an optional implementation, after the authenticator receives the first packet, when the authenticator already stores the MAC address carried in the first packet, and the first IPv6 address is inconsistent with an IPV6 address corresponding to the MAC address in the authenticator, the authenticator determines that the first IPV6 address is a new IPv6 address.

In an optional implementation, after the authenticator receives the first packet, when the authenticator already stores the MAC address carried in the first packet, and the authenticator does not include the first IPV6 address, the authenticator determines that the first IPV6 address is a new IPV6 address.

It should be understood that, when the authenticator determines that the first IPV6 address is a new IPV6 address, the authenticator immediately triggers an operation of sending a second packet to the authentication server. Therefore, it may be understood that the second packet is triggered in real time instead of periodically. That is, each time the authenticator receives an IPv6 address and determines that the IPV6 address is a new IPv6 address, the authenticator triggers the second packet, to send the new IPV6 address and a MAC address corresponding to the new IPV6 address to the authentication server by using the second packet.

In an optional implementation, after receiving the first packet, the authenticator further stores the correspondence between the MAC address and the first IPV6 address. It may also be understood as that the authenticator stores the MAC address and the first IPV6 address in correspondence with each other in the authenticator. After the addresses are stored, the authenticator may find, based on the MAC address, one or more IPV6 addresses (for example, the first IPv6 address) corresponding to the MAC address. Definitely, the authenticator may also find the MAC address based on the first IPV6 address.

In an optional implementation, before receiving the first packet, the authenticator stores a correspondence between the MAC address and at least one IPV6 address, where the MAC address is in a one-to-one correspondence with each of the at least one IPV6 address. In this way, the authenticator can search for the at least one IPV6 address corresponding to the MAC address. When the at least one IPv6 address does not include the first IPV6 address, the authenticator can determine that the first IPV6 address is a new IPV6 address. In addition, the at least one IPV6 address is an IPV6 address that is being used or has been used by the terminal device before the terminal device sends the first packet. For example, the terminal device uses an IPV6 address A for registration and authentication in the authentication server. The terminal device may use the IPV6 address A to send a service packet. Then, the terminal device generates an IPV6 address B and uses the IPV6 address B to send a service packet. Then, the terminal device generates an IPV6 address C, includes the IPV6 address C in the first packet, and sends the first packet to the authenticator. In this case, the at least one IPv6 address stored in the authenticator may be understood as the IPV6 address A and the IPV6 address B in this example, and the first IPv6 address may be understood as the IPV6 address C in this example.

In an optional implementation, the authenticator stores a first correspondence table. The first correspondence table includes the correspondence between the MAC address and the first IPV6 address. It may be understood as that the first correspondence table stores the correspondence between the MAC address and the first IPV6 address.

In this implementation, it is proposed that the authenticator has a table that can store the correspondence between the MAC address and the first IPV6 address. It may also be understood as that the authenticator may store the MAC address and the first IPV6 address in correspondence with each other in the first correspondence table.

In an optional implementation, the authenticator stores a first correspondence table. The first correspondence table includes the correspondence between the MAC address and the at least one IPV6 address. It may also be understood as that the first correspondence table stores the correspondence between the MAC address and the at least one IPV6 address.

In this implementation, after the authenticator receives the first packet, the authenticator queries the first correspondence table. When the first correspondence table stores the MAC address carried in the first packet, and the first IPV6 address is inconsistent with an IPV6 address corresponding to the MAC address in the first correspondence table, the authenticator determines that the first IPV6 address is a new IPV6 address. Alternatively, after the authenticator receives the first packet, the authenticator queries the first correspondence table. When the first correspondence table already stores the MAC address carried in the first packet, and the first correspondence table does not include the first IPV6 address, the authenticator determines that the first IPv6 address is a new IPV6 address.

In an optional implementation, before receiving the first packet, the authenticator stores a correspondence between the MAC address and user information. The user information is information about a user corresponding to the MAC address.

It should be understood that the user is a user of the terminal device, the user has a user account, and the user account logs in to the terminal device, so that the user sends or receives a service packet by using the terminal device. It may also be understood as that, the terminal device is a carrier used by the user to transmit a service packet, and the user can access a network and obtain a service function required by the user only by using the terminal device. The user information is information related to the user, for example, a user identifier, user status information, or other information related to the user.

In this implementation, it is proposed that the authenticator not only stores the correspondence between the MAC address and the first IPV6 address, but also stores the correspondence between the MAC address and the user information. Therefore, the user information can be found by using the MAC address based on the first IPv6 address.

In an optional implementation, the authenticator stores a second correspondence table, where the second correspondence table includes the correspondence between the MAC address and the user information. It may be understood as that the second correspondence table stores the correspondence between the MAC address and the user information.

In this implementation, if the first correspondence table stores the correspondence between the MAC address and the first IPV6 address, and the second correspondence table also stores the correspondence between the MAC address and the user information, to be specific, the user information and the first IPV6 address are stored in different tables in the authenticator, however, because both the correspondence table 1 and the correspondence table 2 store the MAC address, the user information is also associated with the first IPv6 address. In other words, the authenticator may query the first correspondence table and the second correspondence table based on the first IPv6 address, to obtain the user information of the user corresponding to the first IPV6 address.

In an optional implementation, the second correspondence table further includes the correspondence between the MAC address and the first IPV6 address. It may also be understood as that the second correspondence table includes content (for example, the MAC address and the first IPV6 address, for another example, the MAC address and one or more IPV6 addresses corresponding to the MAC address) in the first correspondence table. It may also be understood as that the first correspondence table and the second correspondence table are a same table.

In an optional implementation, the user information includes a user identifier. The user identifier uniquely identifies a user. For example, the user identifier may be information that can uniquely identify a user, such as a user identity number or a user name.

In an optional implementation, the user information includes user status information. The user status information indicates a user status, for example, the user is in an online state or the user is in an offline state. In an example, the user status may indicate that identity authentication succeeds, or may implicitly indicate that the user is online.

In an optional implementation, before the sending a second packet, the method further includes: The authenticator determines that the user corresponding to the first IPV6 address is in the online state. Specifically, the authenticator may query the foregoing table (for example, the second correspondence table) that stores the user status information, and may determine whether the user is in the online state or the offline state based on the user status information.

In an optional implementation, before the authenticator determines that the user is online, the authenticator further determines, based on the MAC address, a user identifier of the user corresponding to the MAC address, and then determines the user status information based on the user identifier. It may be understood as that the authenticator first searches, by using the MAC address, the table (for example, the second correspondence table) that stores the user status information for the user identifier, and then determines the user status information of the user based on the user identifier.

In an optional implementation, before the authenticator determines that the user is online, the authenticator further determines, based on the MAC address, user status information corresponding to the MAC address. It may be understood as that the user status information is directly associated with the MAC address, and the authenticator may search, by using the MAC address, the table (for example, the second correspondence table) that stores the user status information for the user status information of the user.

In an optional implementation, the first correspondence table is a neighbor discovery table or a neighbor discovery snooping table. The neighbor discovery table or the neighbor discovery snooping table is a table related to a neighbor discovery protocol (NDP). After the authenticator receives a neighbor discovery protocol NDP-based packet, the authenticator may generate the table (for example, the neighbor discovery table or the neighbor discovery snooping table) related to the neighbor discovery protocol NDP. The authenticator may use the neighbor discovery table or the neighbor discovery snooping table to store information such as an address that can be stored in the first correspondence table in the foregoing embodiment.

In an optional implementation, the second correspondence table is a neighbor discovery table or a neighbor discovery snooping table.

In an optional implementation, the second packet indicates that the first IPV6 address is a new IPV6 address.

In this implementation, the second packet is a newly defined packet, and the second packet can not only carry an IPV6 address and a MAC address, but also indicate that the first IPV6 address is a new IPV6 address. In other words, a new message for transmitting a new IPV6 address between the authenticator and the authentication server is defined. When receiving the second packet, the authentication server may learn that the IPV6 address carried in the second packet is a new IPV6 address. In this implementation, the authentication server does not need to determine, based on the information stored in the authentication server, whether the first IPV6 address is a new IPV6 address.

In an optional implementation, the second packet includes first indication information, and the first indication information indicates that the first IPV6 address is a new IPv6 address.

In this implementation, a field is extended in the second packet, and the field indicates that the IPV6 address carried in the second packet is a new IPV6 address. The field is first indication information, and the first indication information indicates that the IPV6 address carried in the second packet is a new IPV6 address. In this implementation, when receiving the second packet, the authentication server may learn that the IPV6 address carried in the second packet is a new IPV6 address, and does not need to determine, based on the information stored in the authentication server, whether the first IPv6 address is a new IPV6 address.

In an optional implementation, the first indication information further indicates the authentication server to determine the first authorization policy based on the first IPV6 address.

In this implementation, a field (that is, the first indication information) is extended in the second packet. In addition to indicating that the IPV6 address carried in the second packet is a new IPV6 address, the first indication information further indicates the authentication server to determine an authorization policy (for example, the first authorization policy) based on the IPV6 address (for example, the first IPV6 address) carried in the second packet.

In an optional implementation, the first authorization policy includes an access permission of the terminal device corresponding to the first IPV6 address. The access permission of the terminal device is determined based on an access permission of a user, and the access permission of the user is stored in the authentication server. When determining the first authorization policy, the authentication server may find the access permission of the user based on the MAC address and/or the first IPV6 address, and use the access permission of the user as the access permission of the terminal device to configure the first authorization policy.

In an optional implementation, the second packet is not an authentication request packet. The access management method is implemented after the terminal device completes authentication. Therefore, the second packet is not a packet in an authentication procedure.

In an optional implementation, the second packet is an accounting packet.

In this implementation, if the authentication server is a remote authentication dial in user service (Radius) protocol-based server (referred to as a Radius server for short below), the second packet is a Radius protocol-based packet (referred to as a Radius packet for short below), that is, the second packet may reuse a format of the Radius packet. Because the Radius packet has an accounting function, and if a network admitted by the terminal device needs to be accounted, the second packet may reuse a format of a Radius accounting packet (referred to as an accounting packet for short below). In this case, the second packet is an accounting packet. In addition to carrying the IPV6 address and the MAC address, the second packet further has an accounting function, and can trigger the authentication server to perform real-time accounting. It should be noted that in the conventional technology, an accounting packet is periodically sent. In this implementation, the accounting packet may be immediately triggered to be sent after the authenticator determines the first IPV6 address. Alternatively, it may be understood as that the accounting packet in this implementation is sent in real time. Therefore, this helps the authenticator and the authentication server synchronize an IPV6 address (for example, the first IPV6 address) newly generated by the terminal device, so that the authentication server configures, in a short period of time, an authorization policy (for example, the first authorization policy) based on the IPV6 address (for example, the first IPV6 address) newly generated the terminal device, thereby avoiding service interruption caused by impact on a service packet transmitted by the terminal device by using the first IPV6 address.

It should be further understood that the MAC address and the first IPV6 address are carried in a content field (that is, a payload field) in the second packet.

In an optional implementation, the first packet is a neighbor solicitation NS packet.

The neighbor solicitation NS packet is a packet that is defined by the neighbor discovery protocol (NDP) and that uses an internet control message protocol version 6 (ICMPv6) packet to implement functions such as address resolution, neighbor tracking, duplicate address detection, router discovery, and redirection.

It should be further understood that the MAC address and the first IPV6 address are carried in a content field (that is, a payload field) in the first packet.

In an optional implementation, the method further includes: When a second IPV6 address in a plurality of IPV6 addresses of the terminal device is invalid, the authenticator sends a third packet to the authentication server, where the third packet includes the second IPV6 address and second indication information, and the second indication information indicates that the second IPV6 address is an invalid IPV6 address.

This implementation differs from the conventional technology in that a field indicating that an IPV6 address is invalid is extended. When receiving the first packet, the authentication server may learn that the first packet carries an invalid IPV6 address, so that the authentication server may revoke an authorization policy corresponding to the invalid IPV6 address.

In an optional implementation, the second indication information further indicates the authentication server to revoke an authorization policy corresponding to the second IPV6 address.

In an optional implementation, before the sending a third packet to the authentication server, the method further includes: The authenticator sends a first snooping packet, where a destination address of the first snooping packet is the second IPV6 address; and in response to a fact that no first response packet from the second IPV6 address for the first snooping packet is received, the authenticator determines that the second IPV6 address is invalid. The first response packet from the second IPV6 address may also be understood as that a source address of the first response packet is the second IPV6 address.

In an optional implementation, the method further includes: The authenticator determines that a third IPV6 address in a plurality of IPV6 addresses of the terminal device is invalid, where the third IPV6 address is an IPV6 address finally used by the terminal device; and the authenticator sends a fourth packet to the authentication server, where the fourth packet includes third indication information, and the third indication information indicates a user using the terminal device and corresponding to the third IPV6 address is offline.

The IPV6 address finally used by the terminal device may also be understood as an IPV6 address currently used by the terminal device. For example, the authenticator stores information such as a generation moment, a preferred period, and a valid period of each IPv6 address, and the authenticator may determine, based on the information, which IPV6 address in the plurality of IPV6 addresses corresponding to the terminal device is the IPV6 address finally used by the terminal device.

In this implementation, because one terminal device has a plurality of IPV6 addresses, a user logging in to the terminal device also has a plurality of IPV6 addresses. The authenticator snoops the IPV6 address finally used by the terminal device to determine whether the user is offline. In such an implementation, a quantity of snooping packets sent by the authenticator can be reduced.

In an optional implementation, the third indication information further indicates the authentication server to revoke authorization policies corresponding to all IPV6 addresses corresponding to the user.

In this implementation, a user may correspond to a plurality of IPV6 addresses, and each IPV6 address corresponds to one authorization policy. Therefore, a user has a plurality of authorization policies. Therefore, when the user is offline, authorization policies corresponding to all IPv6 addresses of the user need to be revoked. However, in the conventional technology, a user has only one authorization policy corresponding to an IPV6 address, and only the authorization policy corresponding to the IPV6 address needs to be revoked during revocation.

In an optional implementation, the fourth packet includes at least one of the following: a user identifier corresponding to the third IPV6 address; a MAC address corresponding to the third IPV6 address; or all the IPV6 addresses of the user corresponding to the third IPV6 address.

In an optional implementation, before that the fourth packet is sent to the authentication server, that the authenticator determines that a third IPV6 address in a plurality of IPV6 addresses of the terminal device is invalid may be specifically: The authenticator sends a second snooping packet, where a destination address of the second snooping packet is the third IPV6 address; and in response to a fact that no second response packet from the third IPV6 address for the second snooping packet is received, determines that the third IPV6 address is invalid. The second response packet from the third IPV6 address may also be understood as that a source address of the second response packet is the third IPV6 address.

It should be understood that, because the third IPV6 address is the IPV6 address finally used by the terminal device, when the third IPV6 address is invalid, it may be inferred that other IPv6 addresses corresponding to the terminal device are also invalid. Therefore, the authenticator may determine that the user corresponding to the third IPV6 address is offline.

In this implementation, the IPV6 address finally used by the terminal device is snooped to determine whether the user is offline. This can reduce a quantity of snooping packets sent by the authenticator.

In an optional implementation, that the policy enforcement point is the authenticator may also be understood as: The authenticator and the policy enforcement point are a same apparatus.

In an optional implementation, before the receiving a first packet sent by the terminal device, the method further includes: The authenticator receives a fifth packet, where the fifth packet carries a fourth IPV6 address of the terminal device and the MAC address; and sends a sixth packet to the authentication server, where the sixth packet carries the fourth IPV6 address and the MAC address, and the sixth packet indicates the authentication server to send a second authorization policy to the policy enforcement point based on the fourth IPV6 address.

In an optional implementation, the sixth packet is an authentication request packet.

In an optional implementation, the second authorization policy includes an access permission of the terminal device corresponding to the fourth IPV6 address.

In an optional implementation, the first authorization policy includes an access permission of the terminal device corresponding to the first IPV6 address.

In an optional implementation, the first authorization policy includes the access permission of the terminal device corresponding to the first IPV6 address, and the access permission of the terminal device corresponding to the fourth IPV6 address is the same as the access permission of the terminal device corresponding to the first IPV6 address.

In this implementation, the user corresponding to the terminal device remains logged in to the terminal device and does not go offline, but the terminal device generates a new temporary IPV6 address for the user to use. That is, the user on the terminal device remains unchanged, but the user has a new temporary IPV6 address. Therefore, a behavior of the terminal device still reflects a behavior of the user logging in to the terminal device, and the access permission of the terminal device corresponding to the fourth IPV6 address is the same as the access permission of the terminal device corresponding to the first IPV6 address.

According to a second aspect, an access management method is provided. The method is performed by an authentication server and includes: After a terminal device completes access authentication, receiving a first packet from an authenticator, where the first packet includes a first IPV6 address of the terminal device and a MAC address of the terminal device, and the first IPV6 address is a new temporary IPV6 address of the terminal device; determining, based on the MAC address, that the first IPV6 address is a new IPV6 address; and sending a first authorization policy corresponding to the first IPV6 address to a policy enforcement point, where the first authorization policy includes an access permission of the terminal device corresponding to the first IPV6 address.

In an optional implementation, the authenticator is a switch, a router, or a firewall. In an optional implementation, the policy enforcement point is a switch, a router, or a firewall. In an optional implementation, that the policy enforcement point is the authenticator may also be understood as: The authenticator and the policy enforcement point are a same apparatus.

The authenticator sends the IPV6 address (that is, the first IPV6 address) newly generated by the terminal device and the MAC address to the authentication server. Then, the authentication server determines, based on the first IPV6 address, the first authorization policy sent to the policy enforcement point (that is, a gateway). The first authorization policy sent by the authentication server is determined based on the first IPV6 address (that is, the new IPV6 address). Therefore, after the policy enforcement point receives the first authorization policy, a service packet of the terminal device from the first IPV6 address (which may also be understood as that a source address of the first packet is the first IPV6 address) can be transmitted, through the policy enforcement point, to an address or a network segment that allows a user using the terminal device to access. Therefore, even if the IPV6 address of the terminal device changes, the service is not interrupted.

In an optional implementation, before receiving the first packet, the authentication server does not store a correspondence between the MAC address and the first IPV6 address. It may also be understood as that after the authentication server receives the first packet, when the authentication server determines that the authenticator does not store the correspondence between the MAC address and the first IPV6 address, the authenticator determines that the first IPV6 address is a new IPV6 address.

In an optional implementation, after the authentication server receives the first packet, when the authentication server already stores the MAC address carried in the first packet, and the first IPV6 address is inconsistent with an IPV6 address corresponding to the MAC address in the authentication server, the authentication server determines that the first IPV6 address is a new IPV6 address.

In an optional implementation, after the authentication server receives the first packet, when the authentication server already stores the MAC address carried in the first packet, and the authentication server does not include the first IPV6 address, the authentication server determines that the first IPV6 address is a new IPV6 address.

In an optional implementation, after the receiving the first packet, the method further includes: storing the correspondence between the MAC address and the first IPV6 address. It may also be understood as that the authentication server stores the MAC address and the first IPV6 address in correspondence with each other in the authentication server. After the addresses are stored, the authentication server may find, based on the MAC address, one or more IPV6 addresses (for example, the first IPV6 address) corresponding to the MAC address. Definitely, the authentication server may also find the MAC address based on the first IPV6 address.

In an optional implementation, before receiving the first packet, the authentication server stores a correspondence between the MAC address and at least one IPv6 address, where the MAC address is in a one-to-one correspondence with each of the at least one IPv6 address. In this way, the authentication server can search for the at least one IPV6 address corresponding to the MAC address. When the at least one IPV6 address does not include the first IPV6 address, the authentication server can determine that the first IPV6 address is a new IPv6 address. In addition, the at least one IPV6 address is an IPV6 address that is being used or has been used by the terminal device before the terminal device sends the first packet.

In an optional implementation, the authentication server stores a first correspondence table, and the first correspondence table stores the correspondence between the MAC address and the first IPV6 address. It may also be understood that the first correspondence table includes the correspondence between the MAC address and the first IPV6 address.

In an optional implementation, the authentication server stores a first correspondence table, and the first correspondence table stores a correspondence between the MAC address and at least one IPV6 address. It may also be understood that the first correspondence table includes the correspondence between the MAC address and the at least one IPv6 address.

In this implementation, after the authentication server receives the first packet, the authentication server queries the first correspondence table. When the first correspondence table stores the MAC address carried in the first packet, and the first IPV6 address is inconsistent with an IPV6 address corresponding to the MAC address in the first correspondence table, the authentication server determines that the first IPV6 address is a new IPV6 address. Alternatively, after the authentication server receives the first packet, the authentication server queries the first correspondence table. When the first correspondence table already stores the MAC address carried in the first packet, and the first correspondence table does not include the first IPV6 address, the authentication server determines that the first IPV6 address is a new IPV6 address.

In an optional implementation, before receiving the first packet, the authentication server stores a correspondence between the MAC address and user information. The user information is information about a user corresponding to the MAC address.

It should be understood that the user is a user of the terminal device, the user has a user account, and the user account logs in to the terminal device, so that the user sends or receives a service packet by using the terminal device. It may also be understood that, the terminal device is a carrier used by the user to transmit a service packet, and the user can access a network and obtain a service function required by the user only by using the terminal device. The user information is information related to the user, for example, a user identifier, user status information, and other information related to the user.

In an optional implementation, the authentication server stores a second correspondence table, where the second correspondence table stores the correspondence between the MAC address and the user information. It may be understood as that the second correspondence table includes the correspondence between the MAC address and the user information.

In this implementation, if the first correspondence table stores the correspondence between the MAC address and the first IPV6 address, and the second correspondence table also stores the correspondence between the MAC address and the user information, to be specific, the user information and the first IPV6 address are stored in different tables in the authenticator, however, because both the correspondence table 1 and the correspondence table 2 store the MAC address, the user information is also associated with the first IPV6 address. In other words, the authentication server may query the first correspondence table and the second correspondence table based on the first IPV6 address, to obtain the user information of the user corresponding to the first IPV6 address.

In an optional implementation, the second correspondence table further includes the correspondence between the MAC address and the first IPV6 address. It may also be understood that the second correspondence table includes content (for example, the MAC address and the first IPV6 address, for another example, the MAC address and one or more IPV6 addresses corresponding to the MAC address) in the first correspondence table. It may also be understood that the first correspondence table and the second correspondence table are a same table.

In an optional implementation, the user information includes a user identifier.

In an optional implementation, the user information includes an access permission of the user.

In an optional implementation, before receiving the first packet, the authentication server stores a correspondence between the user identifier and the access permission.

In an optional implementation, the authentication server stores a second correspondence table, where the second correspondence table stores the correspondence between the user identifier and the access permission.

In an optional implementation, the user information includes user status information.

In an optional implementation, after the authentication server determines, based on the MAC address, that the first IPV6 address is a new IPV6 address, and before the authentication server sends the first authorization policy corresponding to the first IPV6 address to the policy enforcement point, the authentication server further determines that the user corresponding to the first IPV6 address is in an online state. Specifically, the authentication server may query the foregoing table (for example, the second correspondence table) that stores the user status information, and may determine whether the user is in the online state or the offline state based on the user status information.

In an optional implementation, before the authentication server determines that the user is online, the authentication server further determines, based on the MAC address, a user identifier of the user corresponding to the MAC address, and then determines the user status information based on the user identifier. It may be understood as that the authentication server first searches, by using the MAC address, the table (for example, the second correspondence table) that stores the user status information for the user identifier, and then determines the user status information of the user based on the user identifier.

In an optional implementation, before the authentication server determines that the user is online, the authentication server further determines, based on the MAC address, user status information corresponding to the MAC address. It may be understood as that the user status information is directly associated with the MAC address, and the authentication server may search, by using the MAC address, the table (for example, the second correspondence table) that stores the user status information for the user status information of the user.

In an optional implementation, the first correspondence table is a neighbor discovery table or a neighbor discovery snooping table. The neighbor discovery table or the neighbor discovery snooping table is a table related to a NDP. After the authentication server receives a neighbor discovery protocol NDP-based packet, the authentication server may generate the table (for example, the neighbor discovery table or the neighbor discovery snooping table) related to the neighbor discovery protocol NDP. The authentication server may use the neighbor discovery table or the neighbor discovery snooping table to store information such as an address that can be stored in the first correspondence table in the foregoing embodiment.

In an optional implementation, the second correspondence table is a neighbor discovery table or a neighbor discovery snooping table.

In an optional implementation, the determining a first authorization policy corresponding to the first IPV6 address includes: determining, based on the MAC address, an access permission of the user corresponding to the first IPV6 address; and determining the first authorization policy based on the first IPV6 address and the access permission.

In an optional implementation, the determining a first authorization policy corresponding to the first IPV6 address includes: The authentication server determines, based on the MAC address, a user identifier of the user corresponding to the first IPV6 address; the authentication server determines the access permission of the user based on the user identifier; and the authentication server determines the first authorization policy based on the first IPV6 address and the access permission.

In an optional implementation, the first packet indicates that the first IPV6 address is a new IPV6 address.

In this implementation, the first packet is a newly defined packet, and the first packet can not only carry an IPV6 address and a MAC address, but also indicate that the first IPV6 address is a new IPv6 address. In other words, a new message for transmitting a new IPV6 address between the authenticator and the authentication server is defined. When receiving the first packet, the authentication server may learn that the IPV6 address carried in the first packet is a new IPV6 address. In this implementation, the authentication server does not need to determine, based on information stored in the authentication server, whether the first IPV6 address is a new IPV6 address.

In an optional implementation, the first packet includes first indication information, and the first indication information indicates that the first IPV6 address is a new IPV6 address.

In this implementation, a field is extended in the first packet, and the field indicates that the IPV6 address carried in the first packet is a new IPV6 address. The field is first indication information, and the first indication information indicates that the IPV6 address carried in the first packet is a new IPV6 address. In this implementation, when receiving the first packet, the authentication server may learn that the IPV6 address carried in the first packet is a new IPV6 address, and does not need to determine, based on information stored in the authentication server, whether the first IPV6 address is a new IPV6 address.

In an optional implementation, the first indication information further indicates the authentication server to determine the first authorization policy based on the first IPV6 address.

In this implementation, a field (that is, the first indication information) is extended in the first packet. In addition to indicating that the IPV6 address carried in the first packet is a new IPV6 address, the first indication information further indicates the authentication server to determine an authorization policy (for example, the first authorization policy) based on the IPV6 address (for example, the first IPV6 address) carried in the first packet.

In an optional implementation, the first packet is not an authentication request packet.

In an optional implementation, the first packet is an accounting packet. It should be further understood that the MAC address and the first IPV6 address are carried in a content field (that is, a payload field) in the first packet.

In an optional implementation, the method further includes: The authentication server receives a second packet from the authenticator, where the second packet includes a second IPV6 address and second indication information, the second indication information indicates that the second IPV6 address is an invalid IPV6 address, and the second IPV6 address is one of a plurality of IPV6 addresses of the terminal device; and the authentication server sends a first revocation indication to the policy enforcement point, where the first revocation indication indicates the policy enforcement point to revoke an authorization policy corresponding to the second IPV6 address, and the first revocation indication includes the second IPV6 address.

In this implementation, a field (that is, the second indication information) is extended in the packet sent by the authenticator to the authentication server, and the second indication information can indicate that the IPV6 address (for example, the second IPV6 address) carried in the second packet is an invalid IPV6 address. Therefore, when the authentication server receives the second packet, the authentication server may determine to revoke the authorization policy corresponding to the second IPV6 address. Therefore, the authentication server sends the first revocation indication to the policy enforcement point, to enable the policy enforcement point to delete the authorization policy related to the second IPV6 address.

In an optional implementation, the second indication information further indicates the authentication server to revoke the authorization policy corresponding to the second IPV6 address.

In an optional implementation, the method further includes: The authentication server receives a third packet from the authenticator, where the third packet includes third indication information, the third indication information indicates that a user using the terminal device and corresponding to the third IPV6 address is offline, and the third IPV6 address is an IPV6 address finally used by the terminal device; and the authentication server sends a second revocation indication to the policy enforcement point, where the second revocation indication indicates the policy enforcement point to revoke authorization policies corresponding to all IPV6 addresses of the user corresponding to the third IPV6 address.

In this implementation, a field (that is, the third indication information) is extended in the packet sent by the authenticator to the authentication server, and the third indication information can indicate that the IPV6 address (for example, the third IPV6 address) carried in the third packet is an invalid IPV6 address. In addition, the third IPV6 address is the IPV6 address finally used by the terminal device. Therefore, when the authentication server receives the third packet, the authentication server may determine that the user corresponding to the third IPV6 address is offline. Therefore, the authentication server may determine to revoke the authorization policies corresponding to the user, that is, the authorization policies corresponding to all the IPV6 addresses corresponding to the user. Then, the authentication server sends a second revocation indication to the policy enforcement point, to enable the policy enforcement point to delete the authorization policies related to all the IPV6 addresses of the user.

In an optional implementation, the third indication information further indicates the authentication server to revoke the authorization policies corresponding to all the IPV6 addresses corresponding to the user corresponding to the third IPv6 address.

In an optional implementation, the third packet includes at least one of the following: a user identifier corresponding to the third IPV6 address; a MAC address corresponding to the third IPV6 address; or all the IPV6 addresses corresponding to the user corresponding to the third IPV6 address.

In an optional implementation, the second revocation indication includes all the IPV6 addresses corresponding to the user corresponding to the third IPV6 address.

In an optional implementation, the policy enforcement point is the authenticator.

In an optional implementation, before the receiving, by the authentication server, a first packet from an authenticator, the method further includes: The authentication server receives a fourth packet from the authenticator, where the fourth packet includes a fourth IPV6 address of the terminal device and the MAC address; the authentication server determines, based on the MAC address, that the fourth IPV6 address is a new IPV6 address; and the authentication server sends a second authorization policy corresponding to the fourth IPV6 address to the policy enforcement point, where the second authorization policy includes an access permission of the terminal device corresponding to the fourth IPv6 address.

In an optional implementation, the determining a second authorization policy corresponding to the fourth IPV6 address includes: determining an access permission of the user based on the correspondence between the MAC address and the access permission of the user; and determining, based on the access permission of the user, the second authorization policy corresponding to the fourth IPV6 address.

In an optional implementation, the fourth packet is an authentication request packet.

It should be noted that there are a plurality of other embodiments of this application. For details, refer to the embodiments and beneficial effects of the first aspect. Details are not described herein again.

According to a third aspect, an access management method is provided. The method is performed by an authenticator and includes: An authenticator determines that a first IPV6 address in a plurality of IPV6 addresses of a terminal device is invalid; and sends a first packet to an authentication server, where the first packet includes the first IPV6 address and first indication information, and the first indication information indicates that the first IPV6 address is an invalid IPv6 address.

In an optional implementation, the first indication information further indicates the authentication server to revoke an authorization policy corresponding to the first IPV6 address.

In an optional implementation, the determining that a first IPv6 address in a plurality of IPV6 addresses of a terminal device is invalid includes: The authenticator sends a snooping packet, where a destination address of the snooping packet is the first IPV6 address; and in response to a fact that no response packet from the first IPV6 address for the snooping packet is received, determines that the first IPV6 address is invalid.

In an optional implementation, the method further includes: when a second IPV6 address in the plurality of IPV6 addresses is invalid, sending a second packet to the authentication server, where the second packet includes the second IPV6 address and second indication information, and the second indication information indicates that the second IPV6 address is an invalid IPV6 address.

It should be noted that there are a plurality of other embodiments of this application. For details, refer to the embodiments and beneficial effects of the first aspect. Details are not described herein again.

According to a fourth aspect, an access management method is provided. The method is performed by an authentication server, the authentication server stores a correspondence among a plurality of IPV6 addresses of a terminal device, a MAC address of the terminal device, and an access permission of a user using the terminal device. The method includes: receiving a first packet from an authenticator, where the first packet includes a first IPV6 address and first indication information, and the first indication information indicates that the first IPV6 address is an invalid IPV6 address; and sending a first revocation indication to a policy enforcement point, where the first revocation indication carries the first IPv6 address, and the first revocation indication indicates the policy enforcement point to revoke an authorization policy corresponding to the first IPV6 address.

In an optional implementation, the first indication information further indicates the authentication server to revoke the authorization policy corresponding to the first IPV6 address.

In an optional implementation, the method further includes: receiving a second packet from the authenticator, where the second packet includes a second IPV6 address and second indication information, and the second indication information indicates that the second IPV6 address is an invalid IPV6 address; and sending a second revocation indication to the policy enforcement point, where the second revocation indication carries the second IPV6 address, and the second revocation indication indicates the policy enforcement point to revoke an authorization policy corresponding to the second IPV6 address.

It should be noted that there are a plurality of other embodiments of this application. For details, refer to the embodiments and beneficial effects of the second aspect. Details are not described herein again.

According to a fifth aspect, an access management method is provided. The method is performed by an authenticator and includes: An authenticator determines that a first IPV6 address in a plurality of IPV6 addresses of a terminal device is invalid, where the first IPV6 address is an IPv6 address finally used by the terminal device; and sends a first packet to an authentication server, where the first packet includes first indication information, and the first indication information indicates that a user using the terminal device and corresponding to the first IPV6 address is offline.

In an optional implementation, the first indication information further indicates the authentication server to revoke authorization policies corresponding to all IPV6 addresses corresponding to the user.

In an optional implementation, the first packet includes at least one of the following: a user identifier corresponding to the first IPV6 address; a MAC address corresponding to the first IPv6 address; or all the IPV6 addresses of the user corresponding to the first IPV6 address.

In an optional implementation, the determining that a first IPV6 address in a plurality of IPV6 addresses of a terminal device is invalid includes: sending a snooping packet, where a destination address of the snooping packet is the first IPV6 address; and in response to a fact that no response packet from the first IPV6 address for the snooping packet is received, determining that the first IPV6 address is invalid.

It should be noted that there are a plurality of other embodiments of this application. For details, refer to the embodiments and beneficial effects of the first aspect. Details are not described herein again.

According to a sixth aspect, an access management method is provided. The method is performed by an authentication server, the authentication server stores a correspondence among a plurality of IPV6 addresses of a terminal device, a MAC address of the terminal device, and an access permission of a user using the terminal device. The method includes: receiving a first packet from an authenticator, where the first packet includes first indication information, the first indication information indicates that a user using the terminal device and corresponding to a first IPV6 address is offline, and the first IPV6 address is an IPV6 address finally used by the terminal device; and sending a revocation indication to a policy enforcement point, where the revocation indication indicates the policy enforcement point to revoke authorization policies corresponding to all IPV6 addresses of the user corresponding to the first IPV6 address.

In an optional implementation, the first indication information further indicates the authentication server to revoke the authorization policies corresponding to all the IPV6 addresses corresponding to the user corresponding to the first IPV6 address.

In an optional implementation, the first packet includes at least one of the following: a user identifier of the user corresponding to the first IPV6 address; a MAC address corresponding to the first IPV6 address; or all the IPV6 addresses corresponding to the user corresponding to the first IPv6 address.

In an optional implementation, the revocation indication includes all the IPV6 addresses corresponding to the user corresponding to the first IPv6 address.

It should be noted that there are a plurality of other embodiments of this application. For details, refer to the embodiments and beneficial effects of the second aspect. Details are not described herein again.

According to a seventh aspect, an embodiment of this application provides a communication apparatus. The communication apparatus may be the authenticator in the foregoing implementations, or may be a chip in the authenticator. The communication apparatus may include a processing module and a transceiver module. When the communication apparatus is the authenticator, the processing module may be a processor, and the transceiver module may be a transceiver. The authenticator may further include a storage module, and the storage module may be a memory. The storage module is configured to store instructions, and the processing module executes the instructions stored in the storage module, to enable the authenticator to perform the method in any one of the first aspect or the implementations of the first aspect, any one of the third aspect or the implementations of the third aspect, or any one of the fifth aspect or the implementations of the fifth aspect. When the communication apparatus is a chip in the authenticator, the processing module may be a processor, and the transceiver module may be an input/output interface, a pin, a circuit, or the like. The processing module executes instructions stored in the storage module, to enable the authenticator to perform the method according to any one of the first aspect or the implementations of the first aspect, any one of the third aspect or the implementations of the third aspect, or any one of the fifth aspect or the implementations of the fifth aspect. The storage module may be a storage module (for example, a register or a cache) in the chip, or may be a storage module (for example, a read-only memory or a random access memory) that is in the authenticator and that is located outside the chip.

According to an eighth aspect, an embodiment of this application provides a communication apparatus. The communication apparatus may be the authentication server in the foregoing implementations, or may be a chip in the authentication server. The communication apparatus may include a processing module and a transceiver module. When the communication apparatus is the authentication server, the processing module may be a processor, and the transceiver module may be a transceiver. The authentication server may further include a storage module, and the storage module may be a memory. The storage module is configured to store instructions, and the processing module executes the instructions stored in the storage module, to enable the authentication server to perform the method according to any one of the second aspect or the implementations of the second aspect, any one of the fourth aspect or the implementations of the fourth aspect, or any one of the sixth aspect or the implementations of the sixth aspect. When the communication apparatus is a chip in the authentication server, the processing module may be a processor, and the transceiver module may be an input/output interface, a pin, a circuit, or the like. The processing module executes instructions stored in the storage module, to enable the authentication server to perform the method according to any one of the second aspect or the implementations of the second aspect, any one of the fourth aspect or the implementations of the fourth aspect, or any one of the sixth aspect or the implementations of the sixth aspect. The storage module may be a storage module (for example, a register or a cache) in the chip, or may be a storage module (for example, a read-only memory or a random access memory) that is in the authentication server and that is located outside the chip.

According to a ninth aspect, this application provides a communication apparatus. The apparatus may be an integrated circuit chip. The integrated circuit chip includes a processor. The processor is coupled to a memory. The memory is configured to store a program or instructions. When the program or the instructions are executed by the processor, the communication apparatus is enabled to perform the method according to any one of the first aspect or the implementations of the first aspect, any one of the third aspect or the implementations of the third aspect, or any one of the fifth aspect or the implementations of the fifth aspect.

According to a tenth aspect, this application provides a communication apparatus. The apparatus may be an integrated circuit chip. The integrated circuit chip includes a processor. The processor is coupled to a memory. The memory is configured to store a program or instructions. When the program or the instructions are executed by the processor, the communication apparatus is enabled to perform the method in any one of the second aspect or the implementations of the second aspect, any one of the fourth aspect or the implementations of the fourth aspect, or any one of the sixth aspect or the implementations of the sixth aspect.

According to an eleventh aspect, an embodiment of this application provides a computer program product including instructions. When the computer program product runs on a computer, the computer is enabled to perform the method described in any one of the first aspect to the sixth aspect or the implementations of the foregoing aspects.

According to a twelfth aspect, an embodiment of this application provides a computer-readable storage medium, including instructions. When the instructions are run on a computer, the computer is enabled to perform the method according to any one of the first aspect to the sixth aspect or the implementations of the foregoing aspects.

According to a thirteenth aspect, an embodiment of this application provides a communication system. The communication system includes the communication apparatus in any one of the seventh aspect and the implementations of the seventh aspect, and the communication device in any one of the eighth aspect and the implementations of the eighth aspect.

According to the foregoing technical solutions, it can be learned that embodiments of this application have the following advantages:

In embodiments of this application, when receiving the first packet that is from the terminal device and that carries the first IPV6 address and the MAC address, the authenticator sends the first IPV6 address and the MAC address to the authentication server when determining that the first IPV6 address is a new IPV6 address. Then, the authentication server determines, based on the first IPV6 address, the first authorization policy sent to the policy enforcement point (that is, a gateway). The first authorization policy sent by the authentication server is determined based on the first IPV6 address (that is, the new IPV6 address). Therefore, after the policy enforcement point receives the first authorization policy, a service packet of the terminal device can be transmitted, through the policy enforcement point, to an address or a network segment that allows the user to access. Therefore, even if the IPV6 address of the terminal device changes, the service is not interrupted.

BRIEF DESCRIPTION OF DRAWINGS

To describe the technical solutions in embodiments of this application more clearly, the following briefly describes the accompanying drawings for describing embodiments. It is clear that the accompanying drawings in the following description show merely some embodiments of this application.

DESCRIPTION OF EMBODIMENTS

Figure 1A:
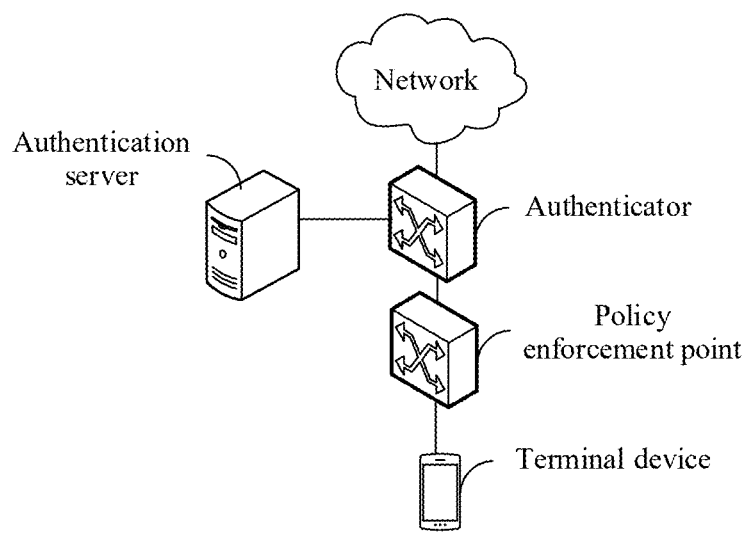
FIG. 1A is a diagram of a system architecture to which an access management method is applicable according to an embodiment of this application.

The following clearly and completely describes the technical solutions in embodiments of this application with reference to the accompanying drawings in embodiments of this application. It is clear that the described embodiments are merely some but not all of embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of operations or units is not necessarily limited to those expressly listed operations or units, but may include other operations or units not expressly listed or inherent to such a process, method, product, or device.

For ease of understanding, the following first explains some technical terms in embodiments of this application.

A GUA is a unicast address that is defined in the IPV6 protocol and that uniquely identifies a user accessing a network. Therefore, the GUA is also referred to as an IPV6 GUA. A terminal device may obtain an IPV6 address through the dynamic host configuration protocol version 6 (DHCPv6) or stateless address autoconfiguration (SLAAC). In a stable network access environment, a same terminal device obtains a same IPV6 GUA when accessing a same network. In addition, a temporary IPV6 GUA is an IPV6 GUA that is generated by a terminal device based on a temporary prefix and that changes along with time, so that a user address is unpredictable. It should be noted that, in subsequent embodiments, the IPV6 GUA is referred to as an IPV6 address for short, and the temporary IPV6 GUA is referred to as a temporary IPV6 address for short.

Stateless address autoconfiguration SLAAC is an address configuration method that can be used to obtain an IPV6 GUA address without a service of a DHCPv6 server. The core of the SLAAC is the ICMPv6. In the SLAAC, prefix information and other configuration information for addressing are provided for the terminal device through a router solicitation (RS) packet and a router advertisement (RA) packet in the ICMPv6 protocol, so that the terminal device may generate a temporary IPv6 address based on the prefix information.

A campus network is an intranet such as a campus network of a university or a local area network of an enterprise. The campus network is characterized in that a routing structure is managed by an organization Generally, the campus network mainly includes a terminal device, a router, and a layer 3 switch.

The neighbor discovery protocol (NDP) is an important basic protocol in the IPV6 protocol suite. The neighbor discovery protocol replaces the IPV4 address resolution protocol (ARP) and the ICMPv4 router discovery protocol. According to the neighbor discovery protocol, ICMPv6 packets are used to implement functions such as address resolution, neighbor tracking, duplicate address detection, router discovery, and redirection. An address resolution process mainly uses a neighbor solicitation (NS) packet and a neighbor advertisement (NA) packet.

The duplicate address detection (DAD) is a process in which a node determines whether an address to be used is unique on a link.

The remote authentication dial in user service (Radius) protocol is a protocol that provides an authentication, authorization, and accounting function.

Before an access management method provided in embodiments of this application is described, the following first describes, by using an example, a system architecture to which the access management method is applicable.

The access management method provided in embodiments of this application may be applied to a scenario of admission of a terminal device to a campus network. Therefore, the system architecture to which the access management method is applicable includes but is not limited to a terminal device, a node that controls admission of the terminal device, and an authentication server. Specifically, when the terminal device needs to access a network (for example, a campus network), the terminal device needs to send information about the terminal device (for example, identity information of the terminal device and address information of the terminal device) to the node, and initiate an authentication procedure through the node. The node sends the information about the terminal device to the authentication server, and the authentication server performs authentication on the terminal device. After the authentication succeeds, the authentication server sends, to the node, an authorization policy for controlling access of the terminal device to the network. Then, the node may control admission of the terminal device according to the authorization policy.

The terminal device is a device supporting a temporary IPV6 address function. Specifically, the terminal device can generate a temporary IPv6 address by using a stateless address autoconfiguration SLAAC solution. To be specific, the terminal device can automatically generate a temporary IPV6 address based on obtained prefix information, and initiate communication by using the temporary IPV6 address as a preferred address by default. For example, the terminal device may be a personal computer (PC) for office, a mobile tablet, a mobile terminal, or an internet of things (IoT) terminal. For example, if a network that the terminal device needs to access with admission is a campus network, the terminal device may be a terminal using a Windows operating system (for example, Windows 10, Windows 8, or Windows 7), a Linux operating system, an Android operating system, or another operating system. This is not specifically limited herein. It should be further noted that a user corresponding to the terminal device is referred to as a user, the user has a user account, and the user account logs in to the terminal device, so that the user sends or receives a service packet by using the terminal device. It may also be understood that, the terminal device is a carrier used by the user to transmit a service packet and the user can access a network and obtain a service function required by the user only by using the terminal device. In addition, when the terminal device initiates the authentication procedure, a user that logs in to the terminal device is definite. After the terminal device is authenticated successfully, the terminal device is bound with the user until the user goes offline.

The authentication server is a server or a controller that has an authentication and authorization function. For example, the authentication server described in this application may be an authentication, authorization, accounting (AAA) server, or another server or controller that supports the remote authentication dial in service (Radius) protocol.

In this application, the node that controls admission of the terminal device may have a function of a gateway. If the node that controls admission of the terminal device can provide an authentication interface for the terminal device, the node has the function of the gateway, and the node may be referred to as an authenticator. If the node that controls admission of the terminal device can execute the authorization policy for controlling admission of the terminal device, the node may be referred to as a policy enforcement point (PEP). The authenticator and the policy enforcement point may be integrated, for example, integrated into a same gateway; or may be disposed as two different apparatuses, for example, separately disposed in two nodes. For example, the authenticator and/or the policy enforcement point may be a device such as a switch, a router, or a firewall, or may be a functional entity configured to perform a specific function in the device, for example, a board or a chip configured to perform a function of the authenticator or a function of the policy enforcement point. This is not specifically limited herein.

In an embodiment, the authenticator and the policy enforcement point are two apparatuses that are independent of each other. As shown in FIG. 1A, the system includes a terminal device, an authentication server, an authenticator, and a policy enforcement point. Before accessing a network, the terminal device initiates authentication through the authenticator, and the authenticator sends information about the terminal device to the authentication server for authentication. After the authentication succeeds, the authentication server sends, to the policy enforcement point, an authorization policy that allows the terminal device to access the network. Subsequently, if the terminal device sends a packet to the policy enforcement point, the policy enforcement point may control transmission of the packet according to the authorization policy.

Figure 1B:
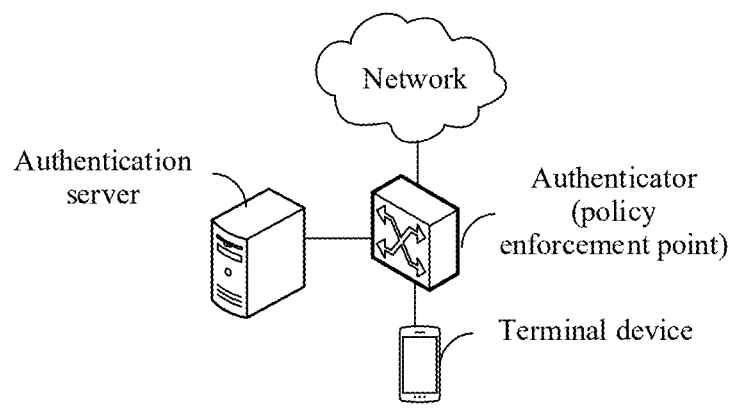
FIG. 1B is a diagram of another system architecture to which an access management method is applicable according to an embodiment of this application.

In another embodiment, the authenticator and the policy enforcement point may be integrated. As shown in FIG. 1B, the system includes a terminal device, an authentication server, and an authenticator (that is, a policy enforcement point).

Figure 1C:
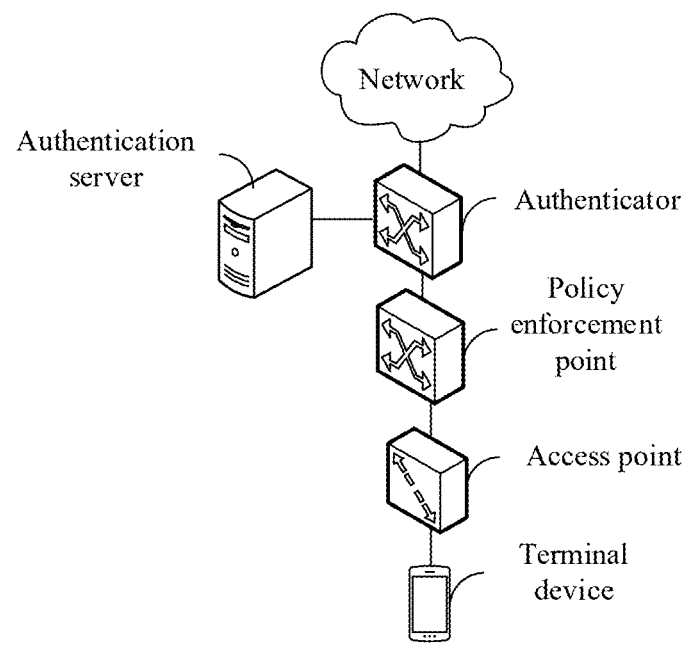
FIG. 1C is a diagram of another system architecture to which an access management method according to an embodiment of this application is applicable.

In another embodiment, if the terminal device is not directly connected to the authenticator (or the policy enforcement point), an access point is further included between the terminal device and the authenticator (or the policy enforcement point). The access point may be a Layer 2 forwarding device (for example, a device such as a Layer 2 switch), and can select an appropriate port to forward a received packet to the authenticator (or the policy enforcement point). As shown in FIG. 1C, the system includes a terminal device, an authentication server, an authenticator, a policy enforcement point, and an access point. In an authentication process, the terminal device sends, to the access point, a packet that carries information about the terminal device, the access point forwards the packet to the authenticator, and then the authenticator sends the packet to the authentication server. After the authentication succeeds, the authentication server sends an authorization policy for the terminal device to the policy enforcement point. Subsequently, the terminal device sends a service packet to the access point, the access point forwards the packet to the policy enforcement point, and then the policy enforcement point controls transmission of the service packet according to the authorization policy.

It should be understood that, an access point may also exist between the terminal device and the authenticator (that is, the policy enforcement point) in FIG. 1B. It can be learned that, during actual application, in addition to the implementations listed in FIG. 1A, FIG. 1B, and FIG. 1C, there may be another implementation of the system architecture to which the access management method is applicable. The system architectures shown in FIG. 1A, FIG. 1B, and FIG. 1C are merely examples listed for ease of understanding by a reader. During actual application, the foregoing system architecture may be appropriately adjusted according to a requirement of an enterprise campus network or a campus network. Details are not described herein. In subsequent embodiments, only the system architecture shown in FIG. 1A is used for description.

For example, an authentication procedure between the authentication server and the authenticator in this application may be an 802.1x protocol-based authentication procedure or a Portal protocol-based authentication procedure.

The 802.1x protocol is an access control and authentication protocol based on a client/server. Based on the 802.1x protocol, access of an unauthorized user/device to a local area network (LAN) or a wireless local area network (WLAN) through an access port (AP) can be limited. Based on the 802.1x protocol, the authenticator first authenticates a terminal device connected to the authenticator. Before the authentication succeeds, the authenticator only allows an extensible authentication protocol over local area network (EAPOL) packet (or data) to pass through a port of the authenticator. After the authentication succeeds, a normal service packet (or data) can smoothly pass through an Ethernet port. In an embodiment, the terminal device may first send a temporary IPV6 address newly generated by the terminal device to the authenticator, and then initiate an authentication procedure to the authentication server through the authenticator. After the authentication succeeds, the authentication server sends an authorization policy to the policy enforcement point based on the temporary IPv6 address. In another embodiment, the terminal device first initiates an authentication procedure to the authentication server through the authenticator, and then sends a temporary IPV6 address newly generated by the terminal device to the authenticator. After the authentication succeeds, the authenticator sends the temporary IPV6 address to the authentication server, so that the authentication server sends an authorization policy to the policy enforcement point based on the temporary IPV6 address.

In addition, in Portal protocol-based authentication (which is also referred to as Web authentication), identity authentication and a personalized information service can be provided for a user in a form of a web page. Generally, the Portal protocol-based authentication procedure is as follows: The terminal device initiates access based on the hypertext transfer protocol (HTTP), and the authenticator redirects a packet from the terminal device to a Portal server, so that the Portal server provides a Portal authentication page for a user through the terminal device. The Portal server receives a user identifier (for example, information such as a user account and a password) that is entered by the user and that is for authentication, and sends the user identifier for authentication to the authenticator, so that the authenticator transmits the user identifier for authentication to the authentication server to initiate the authentication procedure. Therefore, if the Portal protocol-based authentication procedure is used in this application, the authenticator is further connected to the Portal server. In an embodiment, the terminal device first sends a temporary IPv6 address newly generated by the terminal device to the authenticator, and then the authenticator sends a user identifier and the temporary IPV6 address to the authentication server for authentication. After the authentication succeeds, the authentication server sends an authorization policy to the policy enforcement point based on the temporary IPV6 address.

Figure 2A:
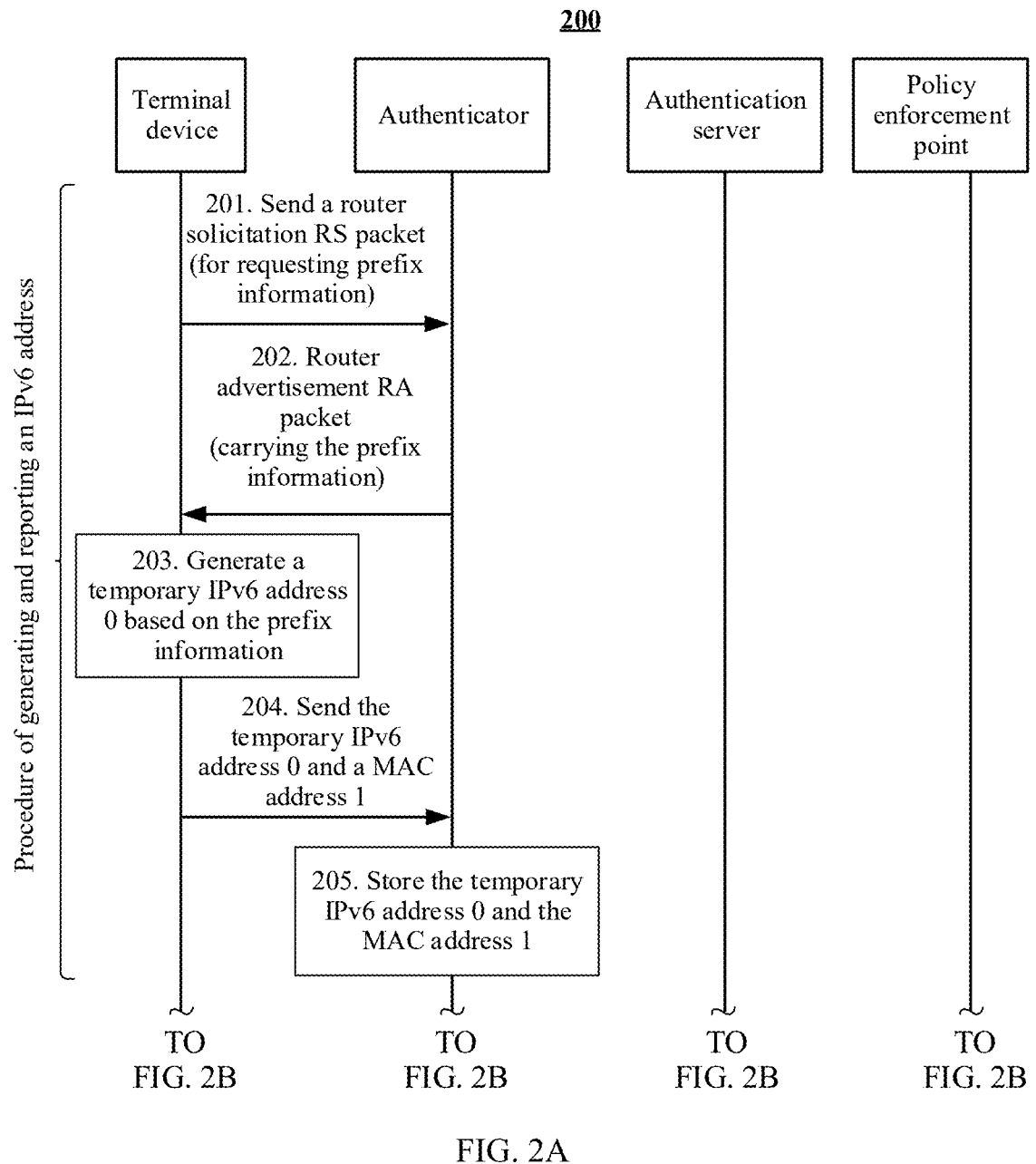
FIG. 2A and FIG. 2B are example diagrams of an 802.1x protocol-based authentication procedure.
Figure 2B:
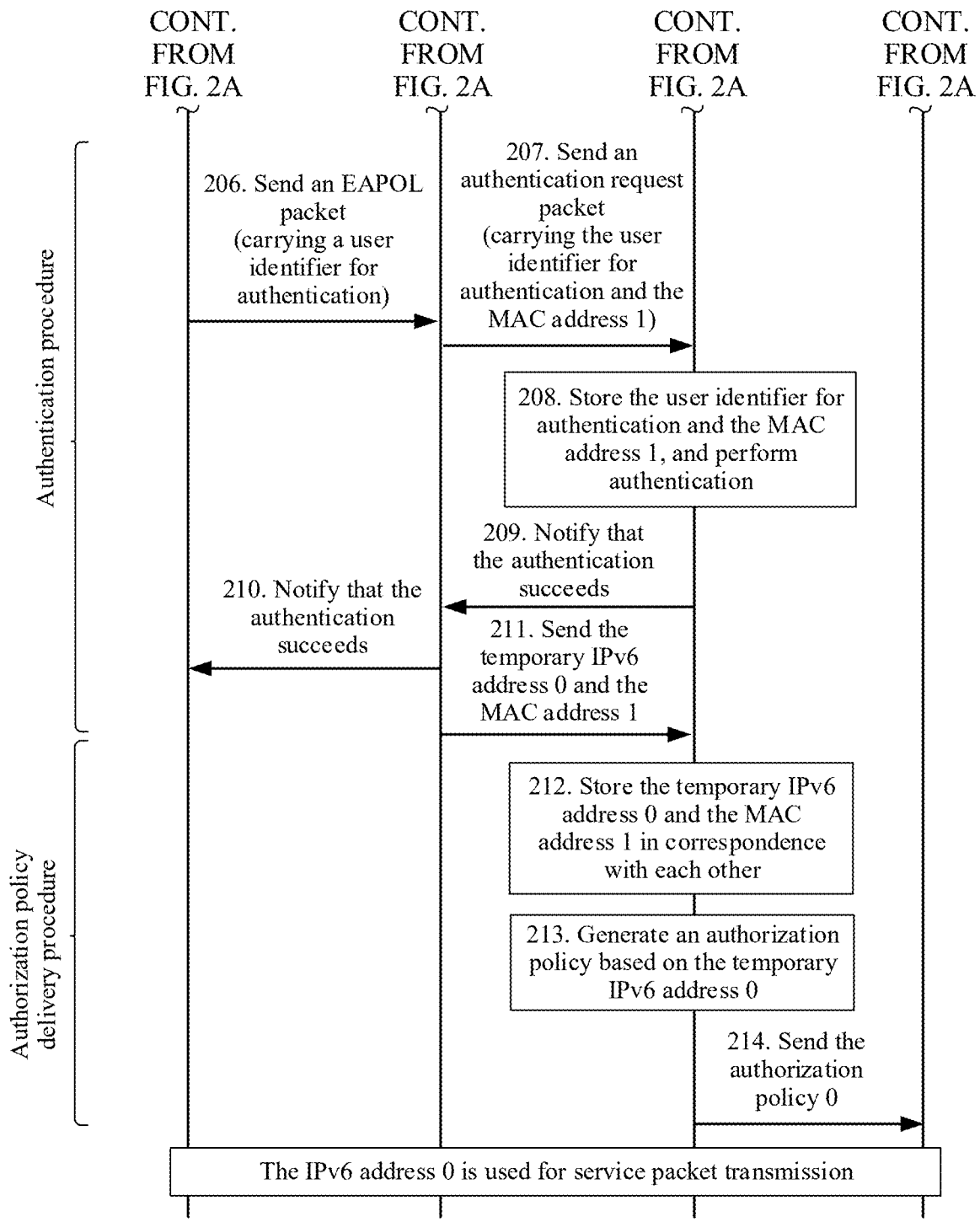

For ease of understanding, the following describes an example of an implementation of the 802.1x protocol-based authentication procedure with reference to FIG. 2A and FIG. 2B. As shown in FIG. 2A and FIG. 2B, a method 200 for performing 802.1x protocol-based authentication includes the following operations.

Operation 201: A terminal device sends a router solicitation RS packet to an authenticator.

The router solicitation RS packet is a packet based on the stateless address autoconfiguration SLAAC protocol, and the router solicitation RS packet is used to request prefix information from the authenticator. The prefix information includes a prefix, a prefix length, and other related information. The prefix may be an IPV6 prefix, an IPV6-PD prefix (which is a DHCP-PD (prefix-delegation) prefix in an IPV6 environment), or the like.

Operation 202: The authenticator sends a router advertisement RA packet to the terminal device.

After the authenticator receives the foregoing router solicitation RS packet, the authenticator sends the router advertisement RA packet to the terminal device. The router advertisement RA packet is also a packet based on the stateless address autoconfiguration SLAAC protocol, and the router advertisement RA packet is used to carry the prefix information.

Operation 203: The terminal device generates a temporary IPV6 address 0 based on the prefix information.

Specifically, the terminal device can generate a temporary IPV6 address of the terminal device based on the prefix and an interface identifier (IID). For example, the terminal device may generate a temporary IPV6 address based on a 64-bit prefix and a 64-bit interface identifier IID. In this case, the terminal device may generate the interface identifier IID in the following two manners: Manner 1: The interface identifier IID is created through a 64-bit extended unique identifier (EUI-64) process and a 48-bit MAC address. Manner 2: A random number generator is used to randomly generate a 64-bit random number as the interface identifier IID. For ease of subsequent description, the temporary IPV6 address generated by the terminal device in operation 203 is referred to as the temporary IPV6 address 0. The temporary IPV6 address 0 may be understood as a temporary IPV6 address generated by the terminal device for the first time. If the terminal device can be authenticated successfully in a subsequent authentication process, the terminal device uses the temporary IPV6 address 0 to transmit a service packet.

In addition, the terminal device further performs duplicate address detection (that is, DAD detection) on the temporary IPV6 address 0. If the temporary IPV6 address 0 does not conflict with an existing IPV6 address, the terminal device performs operation 204.

Operation 204: The terminal device sends the temporary IPV6 address 0 and a MAC address 1 to the authenticator.

The MAC address 1 is a MAC address of the terminal device, and the temporary IPV6 address 0 is the temporary IPV6 address generated in operation 203 (that is, the temporary IPV6 address newly generated by the terminal device).

In this case, the terminal device encapsulates the temporary IPV6 address 0 and the MAC address 1 of the terminal device into a packet, and sends the temporary IPV6 address 0 and the MAC address 1 together to the authenticator by using the packet, so that the authenticator stores the temporary IPV6 address 0 and the MAC address 1 to prepare for a subsequent authentication procedure.

Operation 205: The authenticator stores the temporary IPV6 address 0 and the MAC address 1.

Because the temporary IPV6 address 0 and the MAC address 1 that are received by the authenticator are located in a same packet, the authenticator can determine that the temporary IPV6 address 0 and the MAC address 1 correspond to a same terminal device. It may also be understood that the temporary IPV6 address 0 and the MAC address 1 correspond to a same user. Therefore, the authenticator stores the temporary IPV6 address 0 and the MAC address 1 in correspondence with each other in the authenticator, that is, the authenticator stores a correspondence between the temporary IPV6 address 0 and the MAC address 1. That is, the authenticator can find the MAC address 1 based on the temporary IPV6 address 0, or may find the temporary IPV6 address 0 based on the MAC address 1. In this way, the authenticator identifies a packet subsequently sent by the terminal device, or prepares for a subsequent authentication procedure of the terminal device.

It should be noted that, because the terminal device is not authenticated in this case, the authenticator cannot send the temporary IPV6 address 0 or the MAC address 1 to an authentication server. In addition, the terminal device may communicate with the authenticator only by using an EAPOL packet in the 802.1x protocol.

It should be understood that, before operation 205, because the terminal device is not authenticated, the authenticator does not store the foregoing related information of the terminal device (for example, an IPV6 address of the terminal device or a MAC address of the terminal device). This may also be understood as that related information of a user corresponding to the terminal device is not stored.

Operation 201 to operation 205 are a procedure in which the terminal device generates the temporary IPV6 address 0 and sends the temporary IPV6 address 0 to the authenticator.

Operation 206: The terminal device sends an EAPOL packet to the authenticator.

In operation 206, the terminal device initiates an 802.1x authentication procedure by using an extensible authentication protocol over local area network EAPOL packet. The EAPOL packet carries a user identifier for authentication. For example, the user identifier for authentication may be a user account and a password, or may be a user name and a password. This is not specifically limited herein.

Operation 207: The authenticator sends an authentication request packet to the authentication server.

The authentication request packet is a packet capable of carrying a user identifier and a MAC address. For example, the authentication request packet is a Radius protocol-based packet.

In this operation, the authenticator encapsulates the user identifier for authentication that is carried in the EAPOL packet into the authentication request packet that can be identified by the authentication server, where the authentication request packet carries not only the user identifier for authentication but also the MAC address 1 of the terminal device. In this way, the authentication server can authenticate the terminal device based on the user identifier for authentication. If the authentication succeeds, the MAC address 1 is stored, to identify a packet or information related to the terminal device that is subsequently received.

Operation 208: The authentication server stores the user identifier for authentication and the MAC address 1, and performs authentication.

In operation 208, the authentication server may first store the identifier for authentication and the MAC address 1 that are carried in the authentication packet, and then authenticate the terminal device by using the identifier for authentication; or may authenticate the terminal device by using the identifier for authentication, and after the authentication succeeds, store the identifier for authentication and the MAC address 1 in correspondence with each other.

Specifically, the authentication server stores the user identifier for authentication and the MAC address 1 in correspondence with each other in the authentication server. In addition, the authentication server further stores other information about the terminal device that is generated in the authentication process.

If the authentication server successfully authenticates the terminal device by using the identifier for authentication, the authentication server and the authenticator sequentially perform operation 209 and operation 210.

Operation 209: The authentication server notifies the authenticator that the authentication succeeds.

Operation 210: The authenticator notifies the terminal device that the authentication succeeds.

Operation 206 to operation 210 are a procedure of authenticating the terminal device.

It should be understood that, when the 802.1x protocol-based authentication procedure is used, the foregoing process (that is, operation 201 to operation 205) in which the terminal device sends the newly generated temporary IPV6 address to the authenticator and the authentication procedure (that is, operation 206 to operation 210) of the terminal device may be performed in a different sequence. That is, in another embodiment, the terminal device may first perform 802.1x protocol-based authentication, and then the terminal device generates the temporary IPv6 address and sends the temporary IPV6 address to the authenticator.

Operation 211: The authenticator sends the temporary IPV6 address 0 and the MAC address 1 to the authentication server.

It should be noted that, in the foregoing operation in this scenario, although the terminal device sends the temporary IPV6 address 0 and the MAC address 1 to the authenticator, because the terminal device has not been authenticated, the authenticator in the foregoing operation has not sent the temporary IPV6 address 0 or the MAC address 1 to the authentication server.

However, after operation 209, the authenticator has received a notification about successful authentication of the terminal device, and the authenticator sends the internally stored temporary IPV6 address 0 and MAC address 1 to the authentication server by using a packet, so that the authentication server configures an authorization policy for the terminal device based on the temporary IPV6 address.

Operation 212: The authentication server stores the temporary IPV6 address 0 and the MAC address 1 in correspondence with each other.

In this case, the authentication server stores the temporary IPV6 address 0, the MAC address 1, the user identifier (that is, the user identifier used by the terminal device for authentication), and other information (for example, access permission of the user) about the user or the terminal device that is generated in the authentication process. The information is stored in correspondence with each other in the authentication server. The authentication server can find other information based on one item of the foregoing information.

Operation 213: The authentication server generates an authorization policy 0 based on the temporary IPV6 address 0.

Specifically, the authentication server determines an authorization policy (referred to as the authorization policy 0 below) of the terminal device based on the temporary IPV6 address 0 and the access permission of the user corresponding to the temporary IPV6 address 0.

It should be understood that, after authentication of the terminal device succeeds, the terminal device is bound with the user corresponding to the user identifier, until the user goes offline. Therefore, in this scenario and subsequent embodiments, the access permission of the user may also be understood as access permission of the terminal device. This may also be understood as that the access permission of the terminal device is determined based on the access permission of the user.

Operation 214: The authentication server sends the authorization policy 0 to a policy enforcement point.

Subsequently, a packet transmitted by the terminal device to the policy enforcement point may be transmitted, through a port of the policy enforcement point, to an address or a network segment that allows the terminal device to access.

Operation 211 to operation 214 are a procedure in which the authentication server sends the authorization policy based on the temporary IPV6 address 0 of the terminal device.

It should be understood that the method 200 is merely an example of an admission scenario based on the 802.1x protocol. During actual application, in addition to the operations listed in the foregoing examples, another operation may be included. This is not specifically limited herein.

It can be learned from the foregoing examples that the authorization policy sent by the authentication server to the policy enforcement point is generated based on the temporary IPV6 address of the terminal device. However, the temporary IPV6 address of the terminal device has time validity, that is, the terminal device updates the temporary IPV6 address at intervals. For example, in the request for comments No. 4941 (RFC4941), it is recommended that preferred time of the temporary IPV6 address should be one day, and validity time be seven days. To be specific, it is recommended that the temporary IPV6 address is changed once a day, and the terminal device does not use the temporary IPV6 address after seven days. It should be understood that, during actual application, the preferred time and the validity time of the temporary IPV6 address may be changed according to an actual requirement. This is not specifically limited herein.

After the terminal device updates the temporary IPV6 address, and an updated temporary IPV6 address is also authenticated successfully, the terminal device sends a service packet to the policy enforcement point by using the updated temporary IPV6 address (that is, a new temporary IPV6 address, for example, a temporary IPV6 address 1 described below) as a source address. However, in this case, the policy enforcement point stores the authorization policy related to the temporary IPV6 address (that is, the old temporary IPV6 address, for example, the temporary IPv6 address 0) before the update of the terminal device. In other words, the policy enforcement point does not have an authorization policy related to the updated temporary IPV6 address. Therefore, transmission of the service packet of the terminal device is limited, and consequently, a service of the terminal device is interrupted.

In view of this, this application provides an access management method. The method may be applied to the foregoing 802.1x protocol-based admission scenario (for example, the network scenario shown in FIG. 2A and FIG. 2B) and the foregoing Portal protocol-based admission scenario. In this method, the terminal device can still ensure that a service is not interrupted as much as possible when the temporary IPV6 address is changed.

Figure 3:
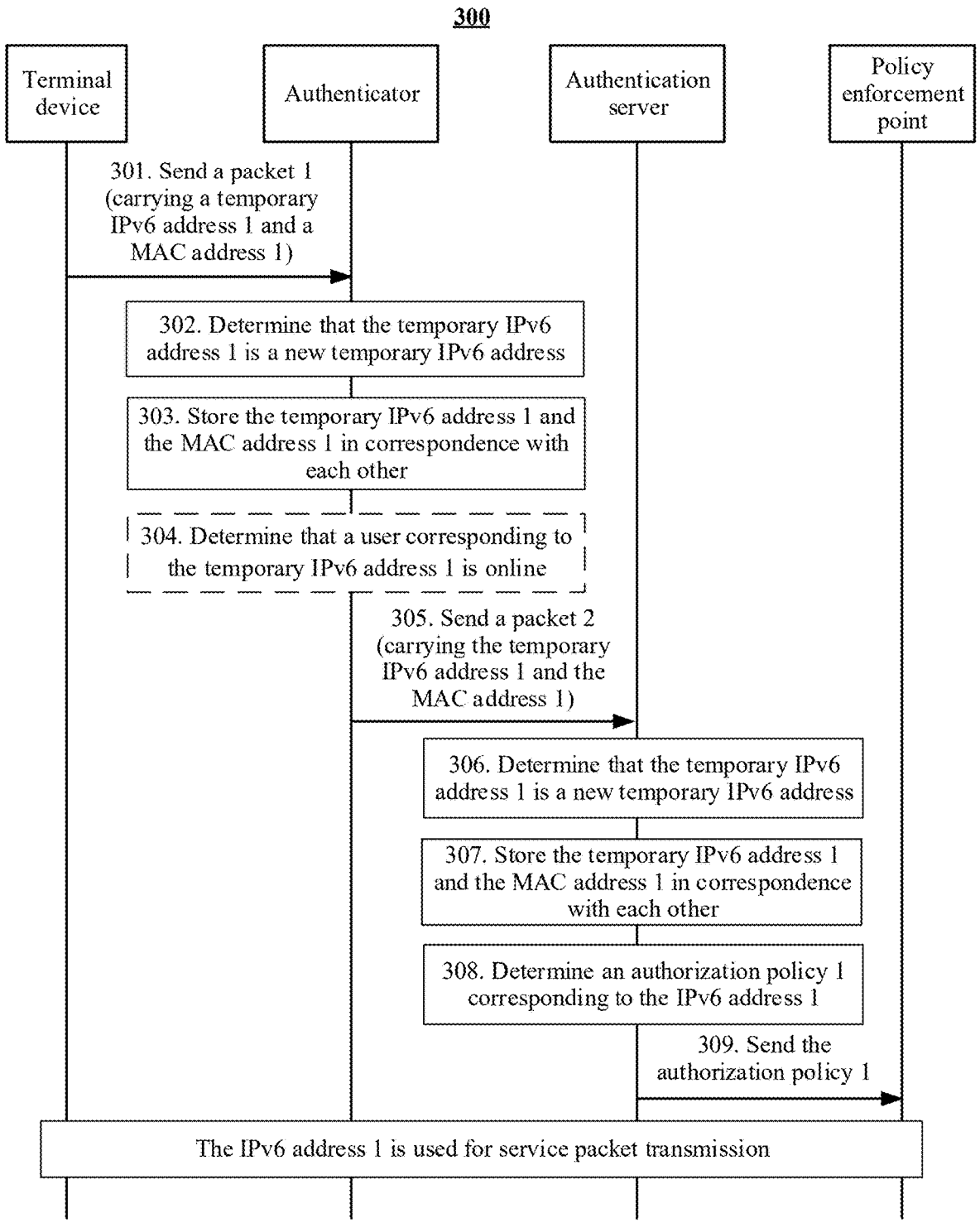
FIG. 3 is a flowchart of an access management method according to an embodiment of this application.

FIG. 3 shows an implementation of an access management method 300 according to this application. When a temporary IPV6 address of a terminal device changes, the terminal device, an authenticator, and an authentication server perform the following operations.

An example in which the temporary IPV6 address of the terminal device changes from a temporary IPv6 address 0 to a temporary IPV6 address 1 is used for description.

Operation 301: The terminal device sends a packet 1 to the authenticator.

The packet 1 carries a temporary IPV6 address (referred to as a temporary IPV6 address 1 below) newly generated by the terminal device and a MAC address (referred to as a MAC address 1 below) of the terminal device. The IPV6 address 1 is generated by the terminal device based on a prefix and an IID. The prefix is obtained from the authenticator through a router solicitation RS packet and a router advertisement RA packet. For details, refer to related descriptions of operation 201 to operation 203. Details are not described herein again.

In addition, the packet 1 is a packet capable of carrying an IPV6 address and a MAC address, and the packet 1 can trigger the authenticator to search, based on the MAC address, for a correspondence related to the MAC address. For example, the packet 1 is a neighbor solicitation NS packet.

It should be understood that, before operation 301, the terminal device uses a temporary IPV6 address (for example, the temporary IPV6 address 0) before the update to send a service packet to a policy enforcement point, and the authentication server and the policy enforcement point store only an authorization policy 0 corresponding to the temporary IPV6 address 0.

When the authenticator receives the packet 1, the authenticator performs operation 302.

Operation 302: The authenticator determines that the temporary IPV6 address 1 is a new temporary IPv6 address.

Because the temporary IPV6 address 1 is an address generated by the terminal device based on a prefix, but not an address configured by the authenticator, the authenticator cannot directly determine whether the temporary IPV6 address 1 is a new temporary IPV6 address. Therefore, after the authenticator receives the temporary IPV6 address 1 and the MAC address 1 in the packet 1, the authenticator needs to determine, based on information stored in the authenticator, whether the temporary IPV6 address 1 is a new temporary IPV6 address. If the temporary IPV6 address 1 is a new temporary IPV6 address, the authenticator performs operation 303. If the temporary IPV6 address 1 is not a new temporary IPV6 address, the authenticator does not perform a subsequent operation.

It should be further understood that before operation 301, the terminal device has generated one or more temporary IPV6 addresses, and the terminal device sends the temporary IPv6 address generated each time and the MAC address (that is, the MAC address 1) of the terminal device to the authenticator for storage. As described in operation 204 and operation 205, the authenticator can receive the temporary IPV6 address 0 and the MAC address 1 from the terminal device, and store the temporary IPV6 address 0 and the MAC address 1. Therefore, the authenticator stores at least one temporary IPV6 address (for example, the temporary IPV6 address 0) and the MAC address (for example, the MAC address 1) corresponding to the temporary IPV6 address. One or more temporary IPV6 addresses corresponding to the MAC address 1 may be found by searching for the MAC address 1. For example, the authenticator stores a MAC address 1, a temporary IPV6 address 0, and a temporary IPV6 address 2. Both the temporary IPV6 address 0 and the temporary IPV6 address 2 are temporary IPV6 addresses generated by the terminal device, and the MAC address 1 is a MAC address of the terminal device. In addition, the temporary IPV6 address 0 and the temporary IPV6 address 2 are stored in the authenticator in correspondence with the MAC address 1. In this case, the authenticator can find, by using the MAC address 1, the temporary IPV6 address 0 and the temporary IPV6 address 2 that correspond to the MAC address 1.

Specifically, the authenticator finds whether the authenticator stores the MAC address 1. If the authenticator stores the MAC address 1 and the one or more temporary IPV6 addresses corresponding to the MAC address 1 do not include the temporary IPV6 address 1 (that is, the temporary IPV6 address carried in the packet 1 received by the authenticator), the authenticator may determine that the temporary IPv6 address 1 is a new temporary IPV6 address. It may also be understood as that if the authenticator determines that a correspondence between the MAC address 1 and the temporary IPV6 address 1 is not stored, the authenticator determines that the IPV6 address 1 is a new IPV6 address.

It should be understood that the authenticator may receive packets from different terminal devices. Therefore, the authenticator may store different MAC addresses and a temporary IPv6 address corresponding to each MAC address. To facilitate maintenance of the MAC address and the temporary IPV6 address received by the authenticator, the authenticator may store the one or more MAC addresses and the one or more temporary IPV6 addresses in a table (referred to as a correspondence table 1 below). The correspondence table 1 is a table in the authenticator, and the correspondence table 1 stores the MAC address, the temporary IPV6 address, and the stored correspondence between the MAC address and the temporary IPV6 address. It may also be understood as that the MAC address and the temporary IPV6 address are stored in the correspondence table 1 in correspondence with each other.

In an embodiment, the correspondence between the MAC address and the temporary IPV6 address in the correspondence table 1 may be implicit. For example, the correspondence Table 1 may be as shown in Table 1-1. In this case, it may be understood that the MAC address and the temporary IPv6 address that are located in a same row correspond to each other, and may be referred to as a correspondence. For example, if the MAC address 1 and the temporary IPV6 address 0 are in the same row, the temporary IPV6 address 0 corresponds to the MAC address 1, or in other words, the temporary IPV6 address 0 and the MAC address 1 has a correspondence. If the MAC address 1 and the temporary IPV6 address 2 are also in the same row, the temporary IPV6 address 2 corresponds to the MAC address 1, or in other words, the temporary IPV6 address 2 and the MAC address 1 has a correspondence.

TABLE 1-1

| MAC address | IPv6 address |
| --- | --- |
| MAC address 1 | Temporary IPv6 address 0 |
| | Temporary IPv6 address 2 |
| | Temporary IPv6 address 3 |
| MAC address 2 | Temporary IPv6 address 4 |
| | Temporary IPv6 address 5 |
| | Temporary IPv6 address 6 |

In another embodiment, the correspondence between the MAC address and the temporary IPV6 address in the correspondence table 1 may also be explicit. For example, the correspondence Table 1 may be as shown in Table 1-2. In this case, the correspondence table 1 includes a column recording a correspondence, and the column clearly records that a temporary IPV6 address corresponds to a MAC address. For example, in a row in which the MAC address 1 and the temporary IPV6 address 0 are located, "the temporary IPV6 address 0 corresponds to the MAC address 1" is recorded.

TABLE 1-2

| MAC address | IPv6 address | Correspondence |
| --- | --- | --- |
| MAC address 1 | Temporary IPv6 address 0 | The temporary IPv6 address 0 corresponds to the MAC address 1. |
| MAC address 1 | Temporary IPv6 address 2 | The temporary IPv6 address 2 corresponds to the MAC address 1. |
| MAC address 1 | Temporary IPv6 address 3 | The temporary IPv6 address 3 corresponds to the MAC address 1. |
| MAC address 2 | Temporary IPv6 address 4 | The temporary IPv6 address 4 corresponds to the MAC address 2. |
| MAC address 2 | Temporary IPv6 address 5 | The temporary IPv6 address 5 corresponds to the MAC address 2. |
| MAC address 2 | Temporary IPv6 address 6 | The temporary IPv6 address 6 corresponds to the MAC address 2. |

It should be understood that Table 1-1 and Table 1-2 are merely two common examples of the correspondence Table 1. In actual application, the correspondence table 1 may further store other information, for example, a port number. This is not specifically limited herein.

Specifically, when the authenticator stores the correspondence table 1, after the authenticator obtains the MAC address 1 and the temporary IP address 1 from the packet 1, the authenticator searches the correspondence table 1 for the MAC address 1. If the correspondence Table 1 includes the MAC address 1, and the one or more temporary IPV6 addresses corresponding to the MAC address 1 do not include the temporary IPV6 address 1, the authenticator determines that the temporary IPV6 address 1 is a new IPV6 address.

It should be further noted that the correspondence table 1 may be a table capable of storing the temporary IPV6 address and the MAC address in the conventional technology, or may be a newly defined table for storing the temporary IPV6 address and the MAC address. This is not specifically limited herein. For example, the correspondence table 1 may be a table generated based on a neighbor discovery protocol NDP packet, for example, a neighbor discovery (ND) table (also referred to as an ND neighbor table) and a neighbor discovery snooping table (also referred to as an ND snooping table).

Operation 303: The authenticator stores the temporary IPV6 address 1 and the MAC address 1 in correspondence with each other.

Specifically, when the authenticator determines that the temporary IPV6 address 1 is a new temporary IPV6 address, the authenticator stores the temporary IPV6 address 1 and the MAC address 1 in correspondence with each other.

In an embodiment, when the authenticator stores the correspondence Table 1, the authenticator stores the temporary IPV6 address 1 and the MAC address 1 in the correspondence Table 1 in correspondence with each other. It may also be understood as that a correspondence between the temporary IPV6 address 1 and the MAC address 1 is stored.

For example, if the correspondence Table 1 is as shown in Table 1-1, after the correspondence is stored, the correspondence Table 1 is as shown in Table 1-3 below.

TABLE 1-3

| MAC address | IPv6 address |
| --- | --- |
| MAC address 1 | Temporary IPv6 address 0 |
| | Temporary IPv6 address 2 |
| | Temporary IPv6 address 3 |
| | Temporary IPv6 address 1 |
| MAC address 2 | Temporary IPv6 address 4 |
| | Temporary IPv6 address 5 |
| | Temporary IPv6 address 6 |

For another example, if the correspondence Table 1 is as shown in Table 1-2, after the correspondence is stored, the correspondence Table 1 is as shown in Table 1-4 below.

TABLE 1-4

| MAC address | IPv6 address | Correspondence |
| --- | --- | --- |
| MAC address 1 | Temporary IPv6 address 0 | The temporary IPv6 address 0 corresponds to the MAC address 1. |
| MAC address 1 | Temporary IPv6 address 2 | The temporary IPv6 address 2 corresponds to the MAC address 1. |
| MAC address 1 | Temporary IPv6 address 3 | The temporary IPv6 address 3 corresponds to the MAC address 1. |

TABLE 1-4-continued

| MAC address | IPv6 address | Correspondence |
|---|---|---|
| MAC address 2 | Temporary IPv6 address 4 | The temporary IPv6 address 4 corresponds to the MAC address 2. |
| MAC address 2 | Temporary IPv6 address 5 | The temporary IPv6 address 5 corresponds to the MAC address 2. |
| MAC address 2 | Temporary IPv6 address 6 | The temporary IPv6 address 6 corresponds to the MAC address 2. |
| MAC address 1 | Temporary IPv6 address 1 | The temporary IPv6 address 1 corresponds to the MAC address 1. |

Operation 304: The authenticator determines that a user corresponding to the temporary IPv6 address 1 is online.

In this embodiment, operation 304 is an optional operation. When operation 304 is performed, the authenticator further stores user status information of a user corresponding to the MAC address 1, that is, user status information of a user (referred to as a user A below) corresponding to the terminal device. The user status information indicates a status of the user A. For example, the user A is in an online state, or the user A is in an offline state. If the user status information indicates that the user A is in the online state, the authenticator performs operation 305. If the user status information indicates that the user A is in the offline state, the authenticator does not perform subsequent operations 305 to 307, but deletes the information corresponding to the user from the authenticator. Specifically, the authenticator can determine, based on the MAC address (that is, the MAC address 1) corresponding to the temporary IPV6 address 1, the user status information corresponding to the MAC address 1, so as to determine whether the user corresponding to the temporary IPV6 address 1 is online. In this process, the authenticator may not need to query a specific user corresponding to the MAC address 1, and only needs to determine whether the user is online.

In an embodiment, the authenticator stores a correspondence table 2, where the correspondence table 2 stores user status information of one or more users and a MAC address corresponding to the user status information of the user. For example, the user status information of the user A may be stored in the correspondence table 2, and the user status information of the user A and the MAC address 1 are stored in correspondence with each other in the correspondence table 2.

For example, the correspondence Table 2 may be shown in Table 2-1. In this case, the MAC address and the user status information in the same row indicate a status of the user corresponding to the MAC address. For example, it can be determined, based on the MAC address 1, that the user corresponding to the MAC address 1 is in the online state. For another example, it can be determined, based on the MAC address 2, that the user corresponding to the MAC address 2 is in the offline state.

TABLE 2-1

| MAC address | User status information |
|---|---|
| MAC address 1 | Online |
| MAC address 2 | Offline |
| MAC address 3 | Online |

In another embodiment, in addition to the user status information and the MAC address, the correspondence table 2 further stores a user identifier, where the user identifier identifies a user corresponding to the MAC address. In addition, the user identifier is also stored in correspondence with the MAC address. Therefore, the user identifier also corresponds to the user status information. It may also be understood as that the MAC address of the user, the user identifier of the user, and the user status information of the user are stored in correspondence with each other in the correspondence table 2. The user identifier may be information that can uniquely identify a user, such as a user identity number (user ID) or a user name. Therefore, when determining the user status information of the user based on the MAC address, the authenticator may also determine the user identifier of the user corresponding to the MAC address.

For example, the correspondence Table 2 may be as shown in Table 2-2. In this case, the MAC address and the user status information in the same row indicate a status of the user corresponding to the MAC address. For example, it can be determined, based on the MAC address 1, that a user corresponding to the MAC address 1 is a user whose user identifier is user name a, and the user corresponding to the MAC address 1 is in the online state. For another example, it can be determined, based on the MAC address 2, that a user corresponding to the MAC address 2 is a user whose user identifier is user name b, and the user corresponding to the MAC address 2 is in the offline state.

TABLE 2-2

| MAC address | User identifier | User status information |
|---|---|---|
| MAC address 1 | User name a | Online |
| MAC address 2 | User name b | Offline |
| MAC address 3 | User name c | Online |

In another embodiment, the correspondence table 2 may include the correspondence table 1. In other words, content in the correspondence table 1 and content in the correspondence table 2 are aggregated in one table.

For example, the table stored in the authenticator may be as shown in Table 2-3.

TABLE 2-3

| User status information | User identifier | MAC address | IPv6 address |
|---|---|---|---|
| Online | User name a | MAC address 1 | Temporary IPv6 address 0 |
| | | | Temporary IPv6 address 2 |
| | | | Temporary IPv6 address 3 |
| | | | Temporary IPv6 address 1 |
| Offline | User name b | MAC address 2 | Temporary IPv6 address 4 |
| | | | Temporary IPv6 address 5 |
| | | | Temporary IPv6 address 6 |

It should be understood that the tables listed in this embodiment and the subsequent embodiments are examples listed to facilitate understanding of a reader, rather than limit the foregoing tables. In actual application, the tables above may be modified based on an actual requirement. This is not specifically limited in this embodiment.

It should be further noted that, in an embodiment, the authenticator may not perform operation 304, but directly perform operation 305. To be specific, after the authenticator stores the temporary IPV6 address 1 and the MAC address 1, the authenticator directly sends the temporary IPV6 address 1 and the MAC address 1 to the authentication server, so that the authentication server generates an authorization policy based on the temporary IPv6 address 1. In such an implementation, it may be understood that the terminal device just generates a new temporary IPV6 address, and the user does not go offline in a short period of time. Alternatively, the authentication server determines whether the user is offline. For details, refer to related descriptions in the embodiment corresponding to FIG. 4.

Operation 305: The authenticator sends a message 2 to the authentication server.

The packet 2 carries the temporary IPV6 address 1 (that is, a temporary IPV6 address newly generated by the terminal device) and the MAC address 1 (that is, the MAC address of the terminal device). The packet 2 is a packet capable of carrying a temporary IPV6 address and a MAC address, and the packet 2 triggers the authentication server to search, based on the MAC address, for a correspondence related to the MAC address. In addition, the packet 2 may use a newly defined packet format, or may reuse a packet format in the conventional technology. If the packet 2 uses a newly defined packet format, the packet 2 needs to carry at least an IPV6 address and a MAC address. If the packet 2 reuses a packet format in the conventional technology, in addition to carrying the IPV6 address and the MAC address, the packet 2 may further have another function.

In an embodiment, the packet 2 reuses an existing packet in the conventional technology. However, a field (referred to as indication information 1 below) is extended in the packet 2. The indication information 1 indicates the authentication server to determine an authorization policy based on an IPV6 address (that is, the temporary IPV6 address 1) carried in the packet 2. In this implementation, after receiving the packet 2, the authentication server needs to determine, based on information stored in the authentication server, whether the temporary IPV6 address 1 is a new temporary IPV6 address.

In another embodiment, the packet 2 is a newly defined packet. The packet 2 can not only carry the temporary IPV6 address and the MAC address, but also indicate that the temporary IPV6 address 1 is a new IPV6 address. In other words, a new packet for transmitting a new IPV6 address between the authenticator and the authentication server is defined. When receiving the packet 2, the authentication server may learn that the IPV6 address carried in the packet 2 is a new IPV6 address. For example, a content field of the packet 2 may be as shown in Table 3-1.

In another embodiment, the packet 2 reuses an existing packet in the conventional technology. However, a field (referred to as indication information 1 below) is extended in the packet 2. The indication information 1 indicates that the IPV6 address (that is, the temporary IPv6 address 1) carried in the packet 2 is a new IPV6 address. For example, the indication information 1 may be represented by an attribute type in an attribute field in Table 3-1 below. In this implementation, after receiving the packet 2, the authentication server may directly determine that the IPV6 address (that is, the temporary IPV6 address 1) carried in the packet 2 is a new IPV6 address, and does not need to determine, based on the information stored in the authentication server, whether the temporary IPV6 address 1 is a new temporary IPV6 address. For example, if the authentication server is a Radius protocol-based server (referred to as a Radius server for short below), the packet 2 is a Radius protocol-based packet (referred to as a Radius packet for short below), that is, the packet 2 may reuse a format of the Radius packet. Because the Radius packet has an accounting function, and if a network admitted by the terminal device needs to be accounted, the packet 2 may reuse a format of a Radius accounting packet (referred to as an accounting packet below). In this case, in addition to carrying the IPV6 address and the MAC address, the packet 2 further has an accounting function, and can trigger the authentication server to perform real-time accounting. Generally, a packet capable of carrying the IPV6 address and the MAC address is generally obtained by encapsulating the IPV6 address and the MAC address in a content field.

For example, a format of the content field of the Radius packet is as shown in Table 3-1 below.

TABLE 3-1

| Code (code) | Identifier (identifier) | Length (length) |
|---|---|---|
| Authenticator (authenticator) | | |
| Attribute (attribute) | | |

The code (code): Indicates a type of the Radius packet. Different Radius packets have different code values. For example, when the code is 1, it indicates an access-request (Access-Request) packet; and when the code is 2, it indicates an access-accept (Access-Accept) packet (also referred to as an access response packet). Identifier (identifier): Matches a request packet and a response packet. For example, after a Radius client (namely, the authenticator) sends a request packet, an identifier value in a response packet returned by a Radius server (namely, the authentication server) should be the same as an identifier value in the request packet. Length (length): Indicates a length of a Radius packet. Authenticator (authenticator): Authenticates the response packet of the Radius server (namely, the authentication server). Attribute (attribute): An attribute field and a content body of a packet. It carries authentication, authorization, and accounting information and provides configuration details of request packets and response packets. In this example, the temporary IPV6 address and the MAC address are carried in the attribute field, and the indication information 1 may be represented by an attribute type (type) in the attribute field.

It should be noted that the packet 2 is a packet triggered by the authenticator in real time. Each time the authenticator receives a new temporary IPV6 address, that is, the authenticator determines that the received temporary IPV6 address is a temporary IPv6 address newly generated by the terminal device, the authenticator triggers sending of the packet 2 to the authentication server, and transmits the temporary IPV6 address newly generated by the terminal device to the authentication server through the packet 2, so that the authentication server has an opportunity to use the temporary IPV6 address newly generated by the terminal device to configure an authorization policy for controlling admission of the terminal device.

When the authentication server receives the packet 2, the authentication server performs operation 306.

Operation 306: The authentication server determines that the temporary IPV6 address 1 is a new temporary IPV6 address.

It should be understood that, before operation 301, as described in operation 211 and operation 212, the authentication server has authenticated the terminal device, and has stored the temporary IPV6 address generated by the terminal device for the first time and the MAC address of the terminal device. Therefore, the authentication server stores at least one temporary IPV6 address (including the temporary IPV6 address generated by the terminal device for the first time) and the MAC address of the terminal device.

In an embodiment, the packet 2 does not indicate that the temporary IPV6 address 1 is a new temporary IPV6 address. In this case, after the authentication server obtains the temporary IPV6 address 1 and the MAC address 1 in the packet 2, the authentication server finds whether the authentication server stores the MAC address 1. If the authentication server stores the MAC address 1 and one or more temporary IPV6 addresses (that is, the temporary IPV6 address carried in the packet 2 received by the authentication server) corresponding to the MAC address 1 do not include the temporary IPV6 address 1, the authentication server may determine that the temporary IPV6 address 1 is a new temporary IPV6 address. It may also be understood that if determining that the correspondence between the MAC address 1 and the temporary IPV6 address 1 is not stored, the authentication server determines that the IPV6 address 1 is a new IPV6 address. In this case, the authentication server triggers execution of operation 307 and operation 308.

In another embodiment, the packet 2 or the indication information 1 carried in the packet 2 indicates that the temporary IPV6 address 1 is a new temporary IPV6 address. In this case, after receiving the packet 2, the authentication server may directly determine that the IPV6 address (that is, the temporary IPV6 address 1) carried in the packet 2 is a new IPV6 address, and does not need to determine, based on the information stored in the authentication server, whether the temporary IPV6 address 1 is a new temporary IPv6 address. In this case, the authentication server triggers execution of operation 307 and operation 308.

It should be understood that the authentication server may perform authentication management on a plurality of terminal devices at the same time. Therefore, the authentication server may store different MAC addresses and a temporary IPV6 address corresponding to each MAC address. To facilitate maintenance of the MAC address and the temporary IPv6 address received by the authentication server, the authentication server stores the one or more MAC addresses and the one or more temporary IPv6 addresses in a table (referred to as a correspondence table 3 below). The correspondence table 3 is a table in the authentication server. The correspondence table 3 stores the MAC address, the temporary IPV6 address, and the correspondence between the MAC address and the temporary IPV6 address. It may also be understood as that the MAC address and the temporary IPV6 address are stored in correspondence with each other in the correspondence table 3.

When the authentication server stores the correspondence table 3, after the authentication server obtains the MAC address 1 and the temporary IP address 1 from the packet 2, the authentication server searches the correspondence table 3 for the MAC address 1. If the correspondence table 3 includes the MAC address 1, and the one or more temporary IPV6 addresses corresponding to the MAC address 1 do not include the temporary IPV6 address 1, the authentication server determines that the temporary IPv6 address 1 is a new IPV6 address.

It should be understood that the correspondence between the MAC address and the temporary IPV6 address in the correspondence table 3 may be implicit or explicit. The correspondence table 3 is similar to the correspondence table 1. For details, refer to related descriptions of the correspondence table 1 in operation 302. Details are not described herein again. The correspondence table 3 may be a table capable of storing the temporary IPV6 address and the MAC address in the conventional technology, or may be a newly defined table for storing the temporary IPv6 address and the MAC address. This is not specifically limited herein.

Operation 307: The authentication server stores the temporary IPV6 address 1 and the MAC address 1 in correspondence with each other.

In this embodiment, the operation in which the authentication server stores the temporary IPV6 address 1 and the MAC address 1 is similar to the operation in which the authenticator stores the temporary IPV6 address 1 and the MAC address 1. For details, refer to related descriptions of operation 303.

In this embodiment, the authentication server can store the temporary IPv6 address (for example, the temporary IPV6 address 0) before the update and the temporary IPV6 address (for example, the temporary IPV6 address 1) after the update; the temporary IPV6 address before the update and the temporary IPV6 address after the update can be associated by using the MAC address (for example, the MAC address 1) of the terminal device; the MAC address of the terminal device is further associated with user information (for example, a user identifier, user status information, and user access permission). Therefore, although the terminal device changes the temporary IPV6 address, the authentication server side can still query the user information based on the temporary IPV6 address after the update. Therefore, the authentication server side can implement source tracing based on the temporary IPV6 address. In addition, after the temporary IPV6 address of the terminal device changes, the terminal device no longer uses the temporary IPV6 address before the update to transmit a service packet. Therefore, a risk of eavesdropping on the IPV6 address by an unauthorized device can be reduced.

Operation 308: The authentication server determines an authorization policy 1 corresponding to the temporary IPV6 address 1.

That the authorization policy restricts an access behavior of the terminal device means that the authentication server configures different authorization policies for different terminal devices. The authorization policy may be understood as a rule that is configured by the authentication server for the policy enforcement point and that is used to control a packet from the terminal device. The policy enforcement point can determine, according to the authorization policy, a destination address to which a packet from a terminal can be transmitted.

For example, the authorization policy may include a source address and a destination address. The source address is a temporary IPV6 address currently used by the terminal device, or may be understood as a temporary IPV6 address (for example, the temporary IPV6 address 1) currently used by the user. The destination address may be understood as an address that allows the terminal device to access, and is determined based on an access permission of the user. In this process, the user is bound to the terminal device, and the authorization policy is used to control an access behavior of the terminal device. Therefore, the destination address may also be understood as an address that allows the user to access.

It should be further understood that different users may correspond to different access permissions. However, the user corresponding to the terminal device remains logged in to the terminal device and does not go offline, but the terminal device generates a new temporary IPV6 address for the user to use. That is, the user on the terminal device remains unchanged, but the user has a new temporary IPV6 address. Therefore, the behavior of the terminal device still reflects the behavior of the user who logs in to the terminal device. Therefore, it may also be understood as that the authorization policy is determined based on an access permission of the user. In other words, the access permission of the user determines an access permission of the terminal device. The authorization policy records the access permission of the terminal device.

In this embodiment, the authentication server stores the access permission of the user, and the access permission of the user can determine the access permission of the terminal device. For example, if an access permission of a user is recorded as an IPV6 address C, it indicates that the user is allowed to access the IPV6 address C, or it may be understood as that the user has a permission to access the IPV6 address C. If the user logs in to a terminal device A, the terminal device A also has the permission to access the IPV6 address C. In addition, the access permission of the user may also indicate a network segment that the user is allowed to access.

In addition, the access permission of the user and a MAC address of the user are stored in correspondence with each other, or the access permission of the user and a user identifier of the user are stored in correspondence with each other. For example, if the authentication server stores a MAC address 1, an access permission of a user corresponding to the MAC address 1 is stored in correspondence with the MAC address 1 in the authentication server. For another example, if the authentication server stores a user identifier, an access permission of a user corresponding to the user identifier and the user identifier are stored in correspondence with each other in the authentication server.

In this embodiment, the access permission of the user may be stored in the correspondence table 3, or may be stored in another table (referred to as a correspondence table 4 below) independent of the correspondence table 3.

For example, when the access permission of the user is stored in the correspondence table 3, if a MAC address and an access permission of a user corresponding to the MAC address are stored in the same row, it indicates that the MAC address corresponds to the access permission of the user. For example, the correspondence Table 3 may be shown in Table 4-1 below:

TABLE 4-1

| Access permission | MAC address | IPv6 address |
|---|---|---|
| IPv6 address C | MAC address 1 | Temporary IPv6 address 0 |
| IPv6 address D | | Temporary IPv6 address 2 |
| IPv6 address E | | Temporary IPv6 address 3 |
| IPv6 address F | | Temporary IPv6 address 1 |
| IPv6 address D | MAC address 2 | Temporary IPv6 address 4 |
| IPv6 address G | | Temporary IPv6 address 5 |
| IPv6 address H | | Temporary IPv6 address 6 |

For example, the correspondence table 3 may further store a user identifier. In this case, the correspondence table 3 may be as shown in Table 4-2.

TABLE 4-2

| Access permission | User identifier | MAC address | IPv6 address |
|---|---|---|---|
| IPv6 address C | User name a | MAC address 1 | Temporary IPv6 address 0 |
| IPv6 address D | | | Temporary IPv6 address 2 |
| IPv6 address E | | | Temporary IPv6 address 3 |
| IPv6 address F | | | Temporary IPv6 address 1 |
| IPv6 address D | User name b | MAC address 2 | Temporary IPv6 address 4 |
| IPv6 address G | | | Temporary IPv6 address 5 |
| IPv6 address H | | | Temporary IPv6 address 6 |

When the access permission of the user is stored independently of the correspondence table 3, the access permission of the user needs to be stored in correspondence with an association identifier. The association identifier is used to correspond the access permission of the user to the user indicated in the correspondence table 3. Because the MAC address and the user identifier in the correspondence table 3 can indicate the user, the association identifier may be a MAC address or a user identifier. For ease of description, a table storing the access permissions of the user is referred to as a correspondence table 4.

When the correspondence Table 3 stores the MAC address and the temporary IPV6 address, the correspondence Table 4 needs to store the access permission of the user and the MAC address. For example, the correspondence Table 4 may be as shown in Table 5-1.

TABLE 5-1

| Access permission | MAC address |
|---|---|
| IPv6 address C | MAC address 1 |
| IPv6 address D | |
| IPv6 address E | |
| IPv6 address F | |
| IPv6 address D | MAC address 2 |
| IPv6 address G | |
| IPv6 address H | |

When the correspondence table 3 stores the user identifier, the MAC address, and the temporary IPV6 address, the correspondence table 4 may store the access permission of the user and the user identifier. For example, the correspondence Table 4 may be as shown in Table 5-2.

TABLE 5-2

| Access permission | User identifier |
|---|---|
| IPv6 address C | User name a |
| IPv6 address D | |
| IPv6 address E | |
| IPv6 address F | |
| IPv6 address D | User name b |
| IPv6 address G | |
| IPv6 address H | |

It should be understood that a manner of storing the information such as the MAC address, the temporary IPV6 address, the user identifier, and the access permission in the authentication server may be adjusted based on an actual requirement. The correspondence table 1, the correspondence table 2, the correspondence table 3, and the correspondence table 4 listed above are merely examples listed to facilitate understanding of a reader. In an actual application, there is a correspondence between the information such as the MAC address, the temporary IPV6 address, the user identifier, and the access permission. When receiving a temporary IPV6 address, the authentication server can determine, based on the correspondences, the access permission of the user corresponding to the temporary IPV6 address.

In an embodiment, the authorization policy includes an IPV6 address currently used by the terminal device and an access permission of the terminal device, and the access permission of the terminal device is determined based on the access permission of the user. It may also be understood as that the authorization policy is determined based on an IPV6 address (for example, the temporary IPV6 address 1) currently used by the terminal device and the access permission of the user. Generally, addresses that allow one user to access are the same. To be specific, although the temporary IPV6 address of a terminal device changes, the access permission of the user corresponding to the terminal device remains unchanged. For example, the temporary IPV6 address of the terminal device before the update is a temporary IPV6 address 0, and the temporary IPV6 address 0 corresponds to an access permission A. If the temporary IPV6 address of the terminal device after the update is the temporary IPV6 address 1, the temporary IPV6 address 1 also corresponds to the access permission A.

In this way, when the authentication server determines that the temporary IPV6 address 1 is a new temporary IPV6 address, the authentication server needs to determine an access permission of a user corresponding to the temporary IPV6 address 1, and determine, based on the temporary IPV6 address 1 and the access permission of the user, an authorization policy (referred to as an authorization policy 1 below) corresponding to the temporary IPV6 address 1. For example, if the access permission of the user corresponding to the temporary IPV6 address 1 is an IPV6 address C, an IPV6 address D, an IPV6 address E, and an IPv6 address F, an authorization policy based on the temporary IPV6 address 1 is: The temporary IPV6 address 1 is allowed to access the IPV6 address C; the temporary IPV6 address 1 is allowed to access the IPV6 address D; the temporary IPv6 address 1 is allowed to access the IPV6 address E; the temporary IPV6 address 1 is allowed to access the IPV6 address F.

It should be understood that a time sequence between operation 307 and operation 308 is not limited. In other words, the authentication server may first perform operation 307 and then perform operation 308, or the authentication server may first perform operation 308 and then perform operation 307, or the authentication server may simultaneously perform operation 307 and operation 308. This is not specifically limited herein.

Operation 309: The authentication server sends the authorization policy 1 to a policy enforcement point.

Subsequently, a packet transmitted by the terminal device to the policy enforcement point may be transmitted, through a port of the policy enforcement point, to an address or a network segment that allows the terminal device to access.

In this embodiment, when receiving a packet 1 from the temporary IPV6 address 1 and the MAC address 1 of the terminal device, the authenticator sends the temporary IPV6 address 1 and the MAC address 1 to the authentication server when determining that the temporary IPV6 address 1 is a new IPV6 address. Then, the authentication server determines, based on the temporary IPv6 address 1, the authorization policy 1 to be sent to the policy enforcement point. The authorization policy 1 sent by the authentication server is determined based on the temporary IPV6 address 1 (that is, a new temporary IPV6 address). Therefore, after the policy enforcement point receives the authorization policy 1, a service packet of the terminal device can be transmitted, through the policy enforcement point, to an address or a network segment that allows the user to access. Therefore, even if the IPV6 address of the terminal device changes, a service is not interrupted, and refined terminal permission policy control can be implemented.

In addition, in this embodiment, when determining that the temporary IPV6 address 1 is a new IPV6 address, the authenticator further determines whether a user corresponding to the temporary IPV6 address 1 is online. The authenticator sends the temporary IPV6 address 1 and the MAC address 1 to the authentication server only when the user corresponding to the temporary IPV6 address 1 is online. This method helps filter out temporary IPV6 addresses of offline users and prevents the authentication server from configuring authorization policies for temporary IPV6 addresses of offline users.

Figure 4:
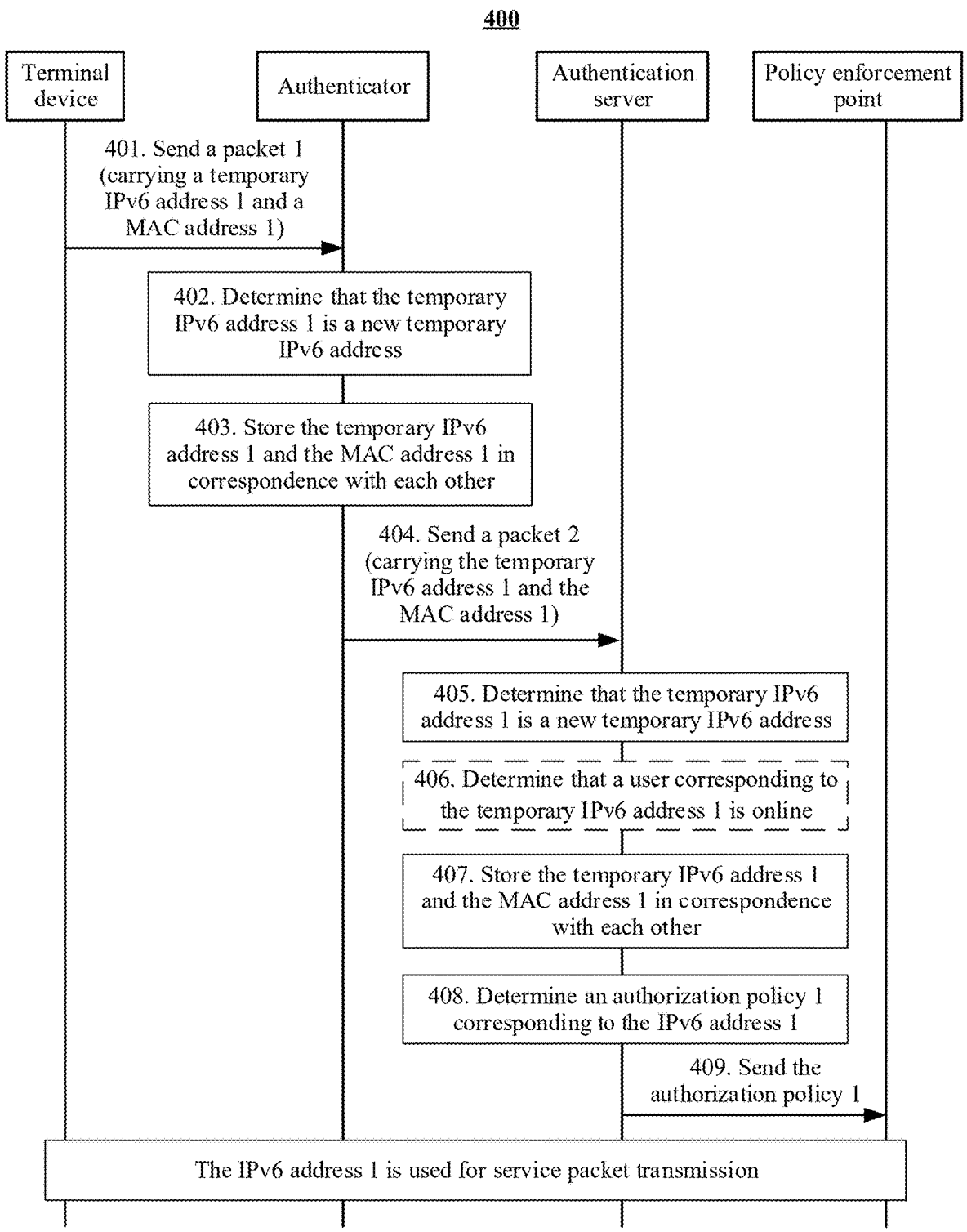
FIG. 4 is another flowchart of an access management method according to an embodiment of this application.

In the embodiment corresponding to FIG. 3, the authenticator determines whether the user corresponding to the temporary IPV6 address 1 is online, and this operation may also be performed by the authentication server. FIG. 4 shows an implementation of an access management method 400 according to this application. When a temporary IPV6 address of a terminal device changes, the terminal device, an authenticator, and an authentication server perform the following operations.

Operation 401: The terminal device sends a packet 1 to the authenticator.

In this embodiment, operation 401 is similar to operation 301. For details, refer to related descriptions of operation 301.

Operation 402: The authenticator determines that the temporary IPV6 address 1 is a new temporary IPv6 address.

When the authenticator determines that the temporary IPV6 address 1 is a new temporary IPv6 address, the authenticator performs operation 403 and operation 404. In addition, for a specific manner in which the authenticator determines that the temporary IPV6 address 1 is a new temporary IPv6 address, refer to operation 302.

In this embodiment, the authenticator does not determine a status of a user corresponding to the temporary IPv6 address 1, but directly sends the temporary IPv6 address 1 and the MAC address 1 to the authentication server, and the authentication server determines the status of the user corresponding to the temporary IPV6 address 1. For details, refer to operation 406.

Operation 403: The authenticator stores the temporary IPV6 address 1 and the MAC address 1 in correspondence with each other.

In this embodiment, operation 403 is similar to operation 303. For details, refer to related descriptions of operation 303.

Operation 404: The authenticator sends a message 2 to the authentication server.

In this embodiment, operation 404 is similar to operation 305. For details, refer to related descriptions of operation 305.

It should be understood that no specific time sequence between operation 403 and operation 404 is limited. That is, the authenticator may first perform operation 403 and then perform operation 404; or may first perform operation 404 and then perform operation 403; or may simultaneously perform operation 403 and operation 404. This is not specifically limited herein.

Operation 405: The authentication server determines that the temporary IPV6 address 1 is a new temporary IPv6 address.

In this embodiment, operation 405 is similar to operation 306. For details, refer to related descriptions of operation 306.

Operation 406: The authentication server determines that a user corresponding to the temporary IPv6 address 1 is online.

In this embodiment, in addition to the correspondence table 3 and correspondence table 4 above, the authentication server further stores a correspondence table 2 for storing user status information of the user. Specifically, the correspondence table 2 is similar to the correspondence table 2 described in operation 304, and the manner in which the authentication server determines whether the user corresponding to the temporary IPV6 address 1 is online is similar to the manner in which the authenticator determines whether the user corresponding to the temporary IPV6 address 1 is online. For details, refer to related descriptions of operation 304.

Operation 407: The authentication server stores the temporary IPV6 address 1 and the MAC address 1 in correspondence with each other.

Operation 408: The authentication server determines an authorization policy 1 corresponding to the IPV6 address 1.

Operation 409: The authentication server sends the authorization policy 1 to a policy enforcement point.

In this embodiment, operation 407 to operation 409 are similar to operation 307 to operation 309. For details, refer to related descriptions of operation 307 to operation 309. Details are not described herein again.

In this embodiment, the operation of determining whether the user corresponding to the temporary IPV6 address 1 is online is performed by the authentication server, so that complexity of the authenticator is reduced. This method helps filter out temporary IPV6 addresses of offline users and prevents the authentication server from configuring authorization policies for temporary IPv6 addresses of offline users.

It should be noted that each time the terminal device generates a new temporary IPV6 address, the terminal device, the authenticator, and the authentication server perform operation 301 to operation 309 or operation 401 to operation 409 again. Therefore, the MAC address 1 stored in the correspondence table 1 corresponds to a plurality of temporary IPV6 addresses, and each temporary IPv6 address has a different generation moment, and each temporary IPV6 address has a different time validity. The newly generated temporary IPV6 address is a preferred temporary IPV6 address. A temporary IPV6 address generated before the latest temporary IPV6 address is generated is no longer a preferred address but a valid address, or an invalid temporary IPV6 address. When an IPV6 address is invalid, the authentication server needs to revoke an authorization policy corresponding to an invalid IPV6 address.

Figure 5:
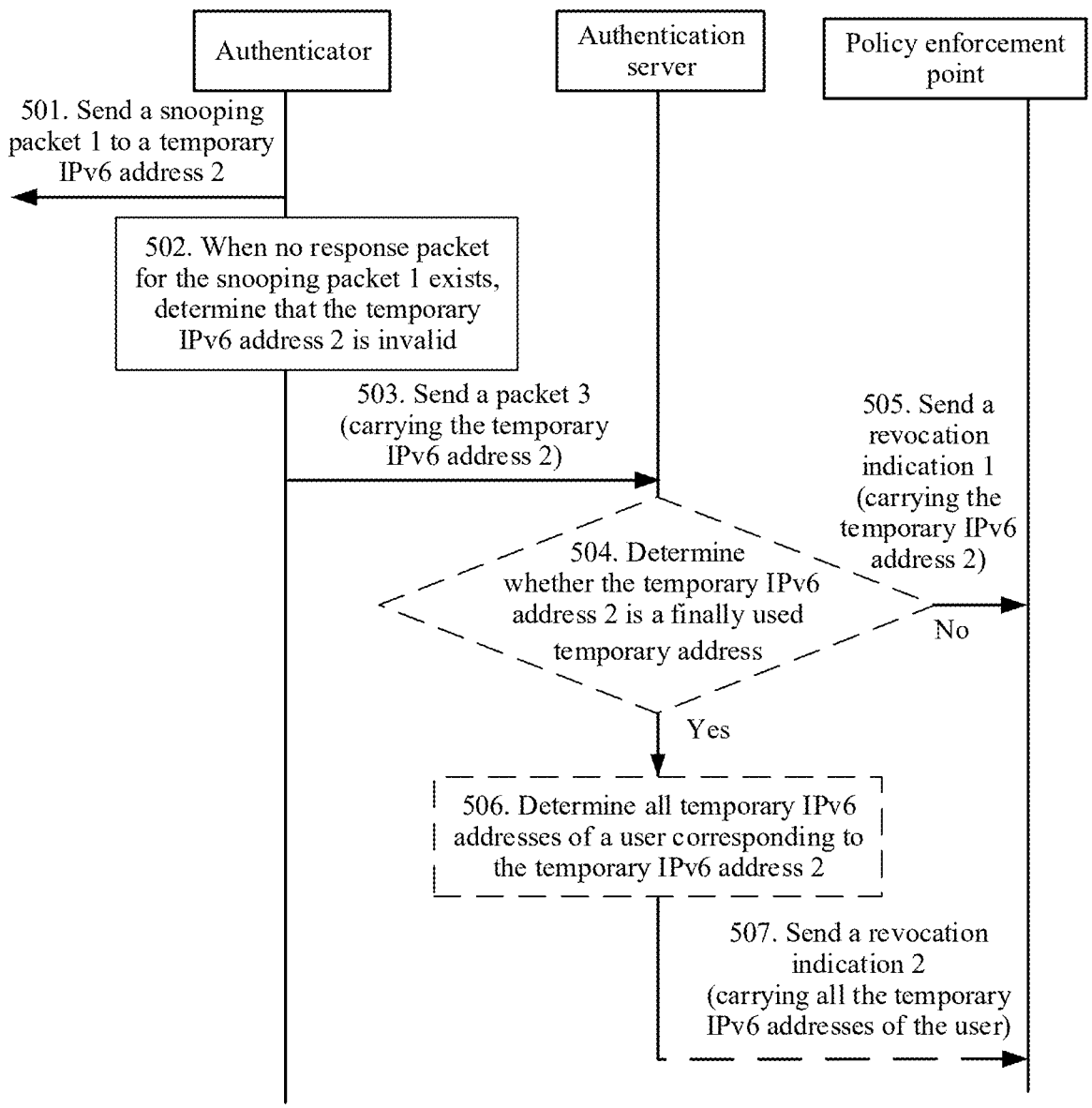
FIG. 5 is another flowchart of an access management method according to an embodiment of this application.

FIG. 5 shows an access management method 500 according to this application. In the method 500, a terminal device, an authenticator, and an authentication server perform the following operations.

Operation 501: The authenticator sends a snooping packet 1 to a temporary IPV6 address 2.

The temporary IPV6 address 2 is any temporary IPV6 address stored in the authenticator. The temporary IPV6 address 2 may be a preferred temporary IPV6 address, a valid temporary IPv6 address, or an invalid temporary IPV6 address. In this case, the authenticator needs to be determined based on a snooping result.

In this embodiment, the snooping packet 1 may be periodically sent by the authenticator, or may be randomly triggered by the authenticator. Generally, the authenticator periodically sends a snooping packet to one or more temporary IPV6 addresses stored in the authenticator. If the temporary IPv6 address is valid, the authenticator receives a response packet for the snooping packet. If the authenticator does not receive a response packet for the snooping packet after a period of time, the authenticator sends a snooping packet to the temporary IPV6 address again. If the authenticator sends a plurality of snooping packets but does not receive a response packet for the snooping packet, the authenticator determines that the temporary IPV6 address is invalid.

Specifically, the authenticator sends the snooping packet 1 by using the temporary IPV6 address 2 as a destination address, and waits for a response packet (referred to as a response packet 1 below) for the snooping packet 1, where a source address of the response packet 1 should be the temporary IPv6 address 2. If the authenticator does not receive the response packet 1 for the snooping packet 1, it is determined that the IPV6 address 2 is invalid.

In an embodiment, the snooping packet 1 and the response packet for the snooping packet 1 are neighbor discovery protocol NDP-based packets. For example, the snooping packet 1 is a neighbor solicitation packet (that is, an NS packet), and a response packet for the snooping packet 1 is a neighbor advertisement packet (that is, an NA packet).

Operation 502: When no response packet for the snooping packet 1 exists, the authenticator determines that the temporary IPV6 address 2 is invalid.

In this embodiment, when the authenticator determines that the temporary IPV6 address 2 is invalid, the authenticator performs operation 503.

Operation 503: The authenticator sends a message 3 to the authentication server.

The packet 3 is a packet capable of carrying an IPV6 address; or the packet 3 is a packet capable of carrying an IPV6 address and a MAC address. The packet 3 includes indication information 2, where the indication information 2 indicates the authentication server to revoke authorization policies corresponding to one or more IPV6 addresses of a user (for example, the authorization policy associated with the temporary IPV6 address 2).

In addition, the packet 3 may use a newly defined packet format, or may reuse a packet format in the conventional technology. For example, if the authentication server is a Radius server, the packet 3 is an accounting packet. Each time the authenticator determines that the temporary IPV6 address 2 is invalid, the authenticator may trigger sending of the packet 3.

In an embodiment, the packet 3 carries the temporary IPV6 address 2 (that is, an invalid temporary IPv6 address). In this implementation, the authentication server considers by default that the temporary IPV6 address 2 in the received packet 3 is a temporary IPV6 address corresponding to an authorization policy to be revoked. In this case, the authentication server directly performs operation 505, and does not perform operation 504, operation 506, and operation 507.

In another embodiment, the packet 3 carries the temporary IPV6 address 2 (that is, an invalid temporary IPV6 address) and the MAC address 1 (that is, a MAC address corresponding to the invalid temporary IPV6 address). The MAC address 1 is used to enable the authentication server to determine a user corresponding to the invalid temporary IPV6 address. In this implementation, the authentication server performs operation 504, and determines, based on a determining result of operation 504, whether to perform operation 505 or perform operation 504, operation 506, and operation 507.

Operation 504: The authentication server determines whether the temporary IPV6 address 2 is a finally used temporary IPV6 address.

In this embodiment, operation 504 is an optional operation.

In this operation, the authentication server searches the correspondence table 3 to determine whether the temporary IPV6 address 2 is the finally used temporary IPV6 address. The IPV6 address finally used by the terminal device may also be understood as an IPV6 address currently used by the terminal device. For example, the authenticator stores information such as a generation moment, a preferred period, and a valid period of each IPV6 address, and the authenticator may determine, based on the information, which IPV6 address in a plurality of IPV6 addresses corresponding to the terminal device is the IPV6 address finally used by the terminal device.

If the correspondence table 3 stores the temporary IPV6 address 2, and in a plurality of temporary IPv6 addresses corresponding to a MAC address 1, the temporary IPV6 address 2 is newly stored to the correspondence table 3, the authentication server may determine that the IPV6 address 2 is the finally used temporary IPV6 address. It may be understood as that the IPV6 address 2 is a latest temporary IPv6 address.

When the authentication server determines that the temporary IPv6 address 2 is the finally used temporary IPV6 address, the authentication server performs operation 506. When the authentication server determines that the temporary IPV6 address 2 is not the finally used temporary IPV6 address, the authentication server performs operation 505.

Operation 505: The authentication server sends a revocation indication 1 to the policy enforcement point.

In this embodiment, when the authentication server determines that the temporary IPV6 address 2 is not the finally used temporary IPV6 address, it indicates that even if the temporary IPV6 address 2 is invalid, but other temporary IPV6 addresses of the user corresponding to the temporary IPV6 address 2 are valid, so that the user can still use the other temporary IPV6 addresses to transmit a service packet. In this case, the authentication server only needs to revoke the authorization policy corresponding to the temporary IPV6 address 2. Therefore, the revocation indication 1 sent by the authentication server to the policy enforcement point carries only the temporary IPV6 address 2, and does not carry other temporary IPv6 addresses. When the policy enforcement point receives the temporary IPV6 address 2, the policy enforcement point deletes all authorization policies corresponding to the temporary IPV6 address 2.

For example, the policy enforcement point stores authorization policies corresponding to the temporary IPv6 address 2 and a temporary IPV6 address 3. The authorization policies are: The temporary IPV6 address 2 is allowed to access an IPV6 address C; the temporary IPV6 address 2 is allowed to access an IPV6 address D; the temporary IPV6 address 3 is allowed to access an IPv6 address E. When the policy enforcement point obtains the temporary IPV6 address 2 in the revocation indication 1, the policy enforcement point deletes the two authorization policies "the temporary IPV6 address 2 is allowed to access an IPv6 address C" and "the temporary IPV6 address 2 is allowed to access an IPV6 address D", and reserves the authorization policy "the temporary IPV6 address 3 is allowed to access an IPV6 address E".

Operation 506: The authentication server determines all temporary IPV6 addresses of the user corresponding to the temporary IPV6 address 2.

In this embodiment, when the authentication server determines that the temporary IPv6 address 2 is the finally used temporary IPV6 address, it indicates that other temporary IPv6 addresses of the user corresponding to the temporary IPV6 address 2 are invalid. Alternatively, it may also be understood as that the user corresponding to the temporary IPV6 address 2 is offline. In this case, the authentication server needs to revoke the authorization policies corresponding to all the temporary IPV6 addresses of the user. Therefore, the authentication server may determine, based on the MAC address 1 in the indication information 1, all the temporary IPV6 addresses corresponding to the user. For example, the correspondence table 3 is searched for all the temporary IPV6 addresses corresponding to the MAC address 1. Then, the revocation indication 2 in operation 507 is sent to the policy enforcement point.

Operation 507: The authentication server sends a revocation indication 2 to the policy enforcement point.

The revocation indication 2 carries all the temporary IPV6 addresses of the user.

When the policy enforcement point receives all the temporary IPV6 addresses of the user, the policy enforcement point deletes the authorization policies corresponding to all the temporary IPv6 addresses.

In this embodiment, it is proposed that when the temporary IPV6 address is invalid, the authentication server can revoke an authorization policy corresponding to an invalid temporary IPV6 address. In the conventional technology, a user has only one authorization policy corresponding to an IPV6 address and can revoke only the authorization policy corresponding to the unique IPV6 address of the user. In the solution of this application, one user has a plurality of temporary IPv6 addresses, and each temporary IPV6 address has an authorization policy. Therefore, in this application, one of the plurality of authorization policies of the user may be revoked. Therefore, authorization policies stored in the policy enforcement point can be flexibly controlled. This helps reduce complexity for the policy enforcement point to search for an authorization policy.

Figure 6:
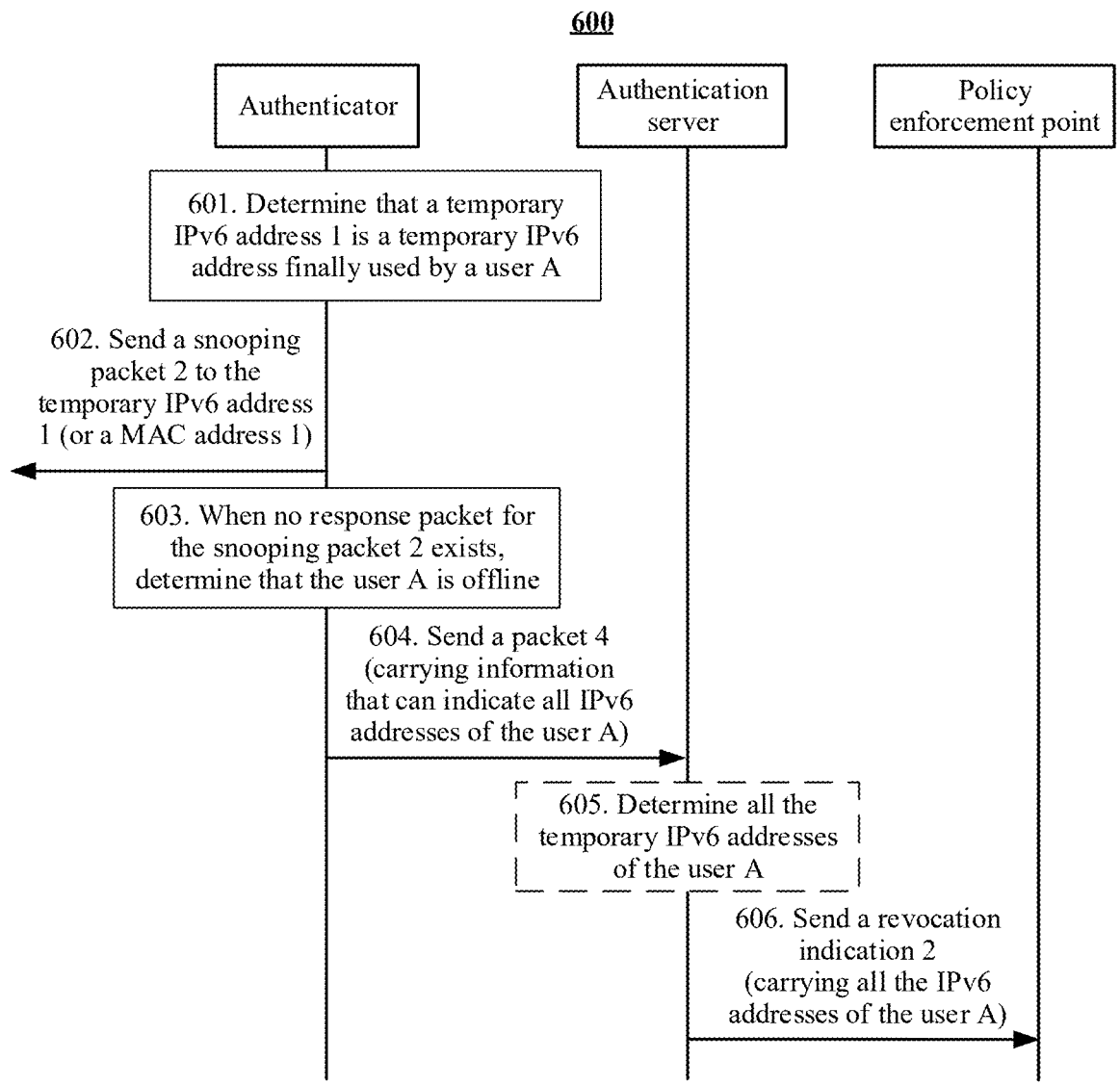
FIG. 6 is another flowchart of an access management method according to an embodiment of this application.

FIG. 6 shows an access management method 600 according to this application. In the method 600, a terminal device, an authenticator, and an authentication server perform the following operations.

Operation 601: The authenticator determines that a temporary IPV6 address 1 is a temporary IPV6 address finally used by a user A.

Because the authenticator stores a correspondence table 1, the authenticator searches the correspondence table 1 to determine whether the temporary IPV6 address 1 is the finally used temporary IPV6 address. If the correspondence table 1 stores the temporary IPV6 address 1, and in a plurality of temporary IPV6 addresses corresponding to a MAC address 1, the temporary IPV6 address 1 is newly stored to the correspondence table 1, the authentication server may determine that the IPV6 address 1 is the finally used temporary IPV6 address. It may be understood as that the IPv6 address 1 is a latest temporary IPv6 address.

It should be understood that a status of the finally used temporary IPV6 address may reflect a status of the user. If the status of the finally used temporary IPV6 address is invalid, the user A corresponding to the finally used temporary IPV6 address is in an offline state; if the status of the finally used temporary IPV6 address is valid, the user A corresponding to the finally used temporary IPv6 address is in an online state.

Operation 602: The authenticator sends a snooping packet 2 to the temporary IPV6 address 1 (or the MAC address 1).

In an embodiment, the authenticator sends the snooping packet 2 by using the temporary IPV6 address 1 as a destination address, and waits for a response packet (referred to as a response packet 2 below) for the snooping packet 2, where a source address of the response packet 2 should be the temporary IPV6 address 1. If the authenticator does not receive the response packet 2 for the snooping packet 2, the authenticator determines that a user corresponding to the IPV6 address 1 is offline (that is, the user A is offline).

In an embodiment, the authenticator sends the snooping packet 2 by using the MAC address 1 as a destination address, and waits for a response packet (referred to as a response packet 2 below) for the snooping packet 2, where a source address of the response packet 2 should be the MAC address 1. If the authenticator does not receive the response packet 2 for the snooping packet 2, the authenticator determines that a user corresponding to the MAC address 1 is offline (that is, the user A is offline).

In addition, the snooping packet 2 and the response packet for the snooping packet 2 are neighbor discovery protocol NDP-based packets. For example, the snooping packet 2 is a neighbor solicitation packet (that is, an NS packet), and a response packet for the snooping packet 2 is a neighbor advertisement packet (that is, an NA packet).

Operation 603: When no response packet for the snooping packet 2 exists, the authenticator determines that the user A is offline.

In an embodiment, after the authenticator determines that the status of the user A is offline, the authenticator performs operation 604. In this case, the authenticator refreshes a correspondence table 2 stored in the authenticator, that is, modifies user status information corresponding to the user A in the correspondence table 2 to offline. For descriptions of the correspondence table 2, refer to the foregoing operation 303.

Operation 604: The authenticator sends a message 4 to the authentication server.

The packet 4 is a packet capable of carrying an IPV6 address; the packet 4 is a packet capable of carrying a MAC address; or the packet 4 is a packet capable of carrying a user identifier. The packet 4 includes indication information 2, where the indication information 2 indicates the authentication server to revoke authorization policies corresponding to one or more IPV6 addresses of a user.

In addition, the packet 4 may use a newly defined packet format, or may reuse a packet format in the conventional technology. For example, if the authentication server is a Radius server, the packet 4 is an accounting packet. Each time the authenticator determines that the user is offline, the authenticator may trigger sending of the packet 4.

In an embodiment, the packet 4 carries information that can indicate all IPv6 addresses of the user A, for example, the MAC address 1 (that is, the MAC address of a user A) and the user identifier of the user A.

Specifically, the authenticator internally stores the correspondence table 1 and/or the correspondence table 2, and the MAC address (that is, the MAC address 1) corresponding to the temporary IPV6 address 1 can be found in the correspondence table 1 and/or the correspondence table 2. Similarly, the authenticator may find, based on the MAC address 1, the user identifier of the user (that is, the user identifier of the user A) corresponding to the MAC address 1 from the correspondence table 1 and/or the correspondence table 2. When this implementation is used, after receiving the packet 4, the authentication server first performs operation 605, and then performs operation 606.

In another embodiment, the packet 4 carries all IPV6 addresses corresponding to the user A.

Specifically, the authenticator finds the MAC address (that is, the MAC address 1) corresponding to the temporary IPV6 address 1 from the correspondence table 1 and/or the correspondence table 2, and may further find all temporary IPV6 addresses corresponding to the MAC address 1 (that is, all the IPV6 addresses corresponding to the user A). When this implementation is used, the authentication server directly performs operation 606 after receiving the packet 4.

It should be noted that, in the conventional technology, a user has only one authorization policy corresponding to one IPV6 address. Therefore, only the authorization policy corresponding to this IPV6 address can be revoked. However, in this application, a user may have authorization policies corresponding to a plurality of different temporary IPV6 addresses. Therefore, the authorization policies corresponding to the plurality of different temporary IPv6 addresses of the user can be revoked.

Operation 605: The authentication server determines all the temporary IPv6 addresses of the user A.

When operation 605 is performed, the authentication server finds all the temporary IPV6 addresses of the user A from a correspondence table 3 and/or a correspondence table 4 by using the MAC address 1 (that is, the MAC address of the user A) or the user identifier of the user A.

Operation 606: The authentication server sends a revocation indication 2 to the policy enforcement point.

The revocation indication 2 carries all the temporary IPV6 addresses of the user A.

When the policy enforcement point receives all the temporary IPV6 addresses of user A, the policy enforcement point deletes the authorization policies corresponding to all the temporary IPv6 addresses.

In this implementation, the authenticator has a capability of determining whether the temporary IPV6 address is the latest temporary IPV6 address. Therefore, the authenticator may find the latest temporary IPV6 address, and determine whether the user is offline by probing the latest temporary IPV6 address. In such an implementation, a quantity of snooping packets sent by the authenticator can be reduced, and efficiency of maintaining the correspondence table 2 can be improved. In addition, the authentication server can determine all the corresponding temporary IPV6 addresses based on the revocation indication 2 of the authenticator and the internally stored correspondence 3 and/or correspondence 4, without including all the temporary IPV6 addresses in the revocation indication 2. This helps reduce complexity of the revocation indication 2, and reduce transmission load of the revocation indication 2.

Figure 7:
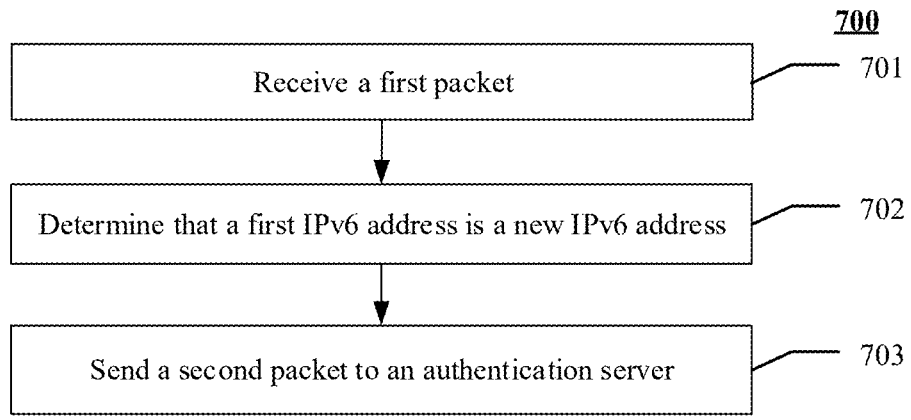
FIG. 7 is another flowchart of an access management method according to an embodiment of this application.

FIG. 7 shows an access management method 700 according to this application. The method 700 is performed by an authenticator. The access management method 700 may be applied to operations performed by the authenticator in the method 300 described in the embodiment corresponding to FIG. 3 and the method 400 described in the embodiment corresponding to FIG. 4. After a terminal device completes access authentication, the access management method 700 includes the following operations.

Operation 701: Receive a first packet.

The first packet carries a first IPV6 address of the terminal device and a MAC address of the terminal device, and the first IPV6 address is a temporary IPV6 address newly generated by the terminal device.

The first packet in the method 700 may correspond to the packet 1 in the method 300; the first IPV6 address in the method 700 may correspond to the IPV6 address 1 in the method 300; the MAC address in the method 700 may correspond to the MAC address 1 in the method 300.

Alternatively, the first packet in the method 700 may correspond to the packet 1 in the method 400; the first IPV6 address in the method 700 may correspond to the IPV6 address 1 in the method 400; the MAC address in the method 700 may correspond to the MAC address 1 in the method 400.

Operation 702: Determine that the first IPV6 address is a new IPV6 address.

In an implementation, before receiving the first packet, the authenticator does not store a correspondence between the MAC address and the first IPV6 address.

Operation 703: Send a second packet to an authentication server.

The second packet carries the first IPv6 address and the MAC address, and the second packet indicates the authentication server to send a first authorization policy to a policy enforcement point based on the first IPV6 address.

The second packet in the method 700 may correspond to the packet 2 in the method 300; or the second packet in the method 700 may correspond to the packet 2 in the method 400.

In an implementation, after receiving the first packet, the authenticator stores the correspondence between the MAC address and the first IPV6 address.

In an implementation, before receiving the first packet, the authenticator stores a correspondence between the MAC address and at least one IPV6 address, the MAC address is in a one-to-one correspondence with each of the at least one IPV6 address, and the at least one IPV6 address is an IPV6 address that is being used or has been used by the terminal device before the terminal device sends the first packet.

In an implementation, the authenticator stores a first correspondence table, and the first correspondence table stores the correspondence between the MAC address and the first IPv6 address.

The first correspondence table in the method 700 may correspond to the correspondence table 1 in the method 300 or the method 400.

For example, the first correspondence table may be as shown in Table 1-1, Table 1-2, Table 1-3, and Table 1-4.

In an implementation, the authenticator stores a first correspondence table, and the first correspondence table stores the correspondence between the MAC address and at least one IPV6 address.

In an implementation, before receiving the first packet, the authenticator stores a correspondence between the MAC address and user information.

In an implementation, the authenticator stores a second correspondence table, where the second correspondence table stores the correspondence between the MAC address and the user information.

The first correspondence table in the method 700 may correspond to the correspondence table 2 in the method 300 or the method 400.

For example, the first correspondence table may be Table 2-1 or Table 2-2 above.

In an implementation, the second correspondence table further includes the correspondence between the MAC address and the first IPV6 address. It may also be understood that the second correspondence table includes the first correspondence table. In this case, content in the first correspondence table and content in the second correspondence table in this implementation are stored in one table, for example, Table 2-3 described above.

In an implementation, the user information includes a user identifier. The user identifier may be information that can uniquely identify a user, such as a user identity number (user ID) or a user name.

In an implementation, the user information includes user status information.

In an implementation, before the sending a second packet, the method further includes: determining, based on the user status information, that the user is online.

In an implementation, before the determining, based on the user status information, that the user is online, the method further includes: determining the user identifier based on the MAC address; and determining the user status information based on the user identifier.

In an implementation, the first correspondence table stored in the authenticator is a neighbor discovery table or a neighbor discovery snooping table.

In an implementation, the second correspondence table stored in the authenticator is a neighbor discovery table or a neighbor discovery snooping table.

In an implementation, the second packet indicates that the first IPV6 address is a new IPv6 address.

In an implementation, the second packet includes first indication information, and the first indication information indicates that the first IPV6 address is a new IPV6 address.

The first indication information in the method 700 may correspond to the indication information 1 in the method 300 or the method 400.

For example, the first indication information may be represented by an attribute type in the attribute field in Table 3-1.

In an implementation, the first indication information further indicates the authentication server to determine the first authorization policy based on the first IPV6 address.

The first indication information in the method 700 may correspond to the authorization policy 1 in the method 300 or the method 400.

In an implementation, the second packet is not an authentication request packet.

In an implementation, the second packet is an accounting packet.

In an implementation, the first packet is a neighbor solicitation NS packet.

In an implementation, the method further includes: when a second IPV6 address in a plurality of IPV6 addresses of the terminal device is invalid, sending a third packet to the authentication server, where the third packet includes the second IPV6 address and second indication information, and the second indication information indicates that the second IPV6 address is an invalid IPV6 address.

The second IPV6 address in the method 700 may correspond to the IPV6 address 2 in the method 500; the third packet in the method 700 may correspond to the packet 3 in the method 500; the second indication information in the method 700 may correspond to the indication information 2 in the method 500.

In an implementation, the second indication information further indicates the authentication server to revoke an authorization policy corresponding to the second IPV6 address.

In an implementation, before the sending a third packet to the authentication server, the method further includes: sending a first snooping packet, where a destination address of the first snooping packet is the second IPV6 address; and in response to a fact that no first response packet from the second IPV6 address for the first snooping packet is received, determining that the second IPv6 address is invalid.

The first snooping packet in the method 700 may correspond to the snooping packet 1 in the method 500; the first response packet in the method 700 may correspond to the response packet 1 in the method 500.

In an implementation, the method further includes: determining that a third IPV6 address in a plurality of IPV6 addresses of the terminal device is invalid, where the third IPv6 address is an IPV6 address finally used by the terminal device; and sending a fourth packet to the authentication server, where the fourth packet includes third indication information, and the third indication information indicates that a user using the terminal device and corresponding to the third IPv6 address is offline.

The third IPV6 address in the method 700 may correspond to the temporary IPV6 address 1 in the method 600; the fourth packet in the method 700 may correspond to the packet 4 in the method 600; the third indication information in the method 700 may correspond to the indication information 2 in the method 600; the user in the method 700 may correspond to the user A in the method 600.

In an implementation, the third indication information further indicates the authentication server to revoke authorization policies corresponding to all IPV6 addresses corresponding to the user.

In an implementation, the fourth packet includes at least one of the following: a user identifier corresponding to the third IPV6 address; a MAC address corresponding to the third IPV6 address; or all the IPV6 addresses of the user corresponding to the third IPV6 address.

The MAC address in the method 700 may correspond to the MAC address 1 in the method 600.

In an implementation, that the authenticator determines that a third IPV6 address in a plurality of IPV6 addresses of the terminal device is invalid may be specifically: The authenticator sends a second snooping packet, where a destination address of the second snooping packet is the third IPV6 address; and in response to a fact that no second response packet from the third IPV6 address for the second snooping packet is received, determines that the third IPV6 address is invalid.

The second snooping packet in the method 700 may correspond to the snooping packet 2 in the method 600.

In an implementation, the policy enforcement point is the authenticator.

In an implementation, before the receiving a first packet, the method further includes: receiving a fifth packet sent by the terminal device, where the fifth packet includes a fourth IPV6 address of the terminal device and the MAC address; and sending a sixth packet to the authentication server, where the sixth packet includes the fourth IPV6 address and the MAC address, and the sixth packet indicates the authentication server to send a second authorization policy to the policy enforcement point based on the fourth IPV6 address.

The fifth packet in the method 700 may correspond to the packet encapsulating the temporary IPV6 address 0 and the MAC address 1 in operation 204 in the method 200. The fourth IPV6 address corresponds to the temporary IPV6 address 0, and the MAC address corresponds to the MAC address 1. The sixth packet in the method 700 may correspond to the packet encapsulating the temporary IPV6 address 0 and the MAC address 1 in operation 211 in the method 200.

In an implementation, the sixth packet is an authentication request packet.

In an implementation, the second authorization policy includes an access permission of the terminal device corresponding to the fourth IPV6 address.

The second authorization policy in the method 700 may correspond to the authorization policy 0 in the method 200.

In an implementation, the first authorization policy includes an access permission of the terminal device corresponding to the first IPV6 address.

The second authorization policy in the method 700 may correspond to the authorization policy 1 in the method 300 or the method 400.

In an implementation, the first authorization policy includes the access permission of the terminal device corresponding to the first IPV6 address, and the access permission of the terminal device corresponding to the fourth IPV6 address is the same as the access permission of the terminal device corresponding to the first IPV6 address.

In this embodiment, the authenticator can send the new IPV6 address to the authentication server, to enable the authentication server to formulate the first authorization policy for network admission based on the first IPV6 address. Therefore, a service packet of the terminal device can be transmitted, through the policy enforcement point, to an address or a network segment that allows a user to access. Therefore, even if the IPV6 address of the terminal device changes, the service is not interrupted.

Figure 8:
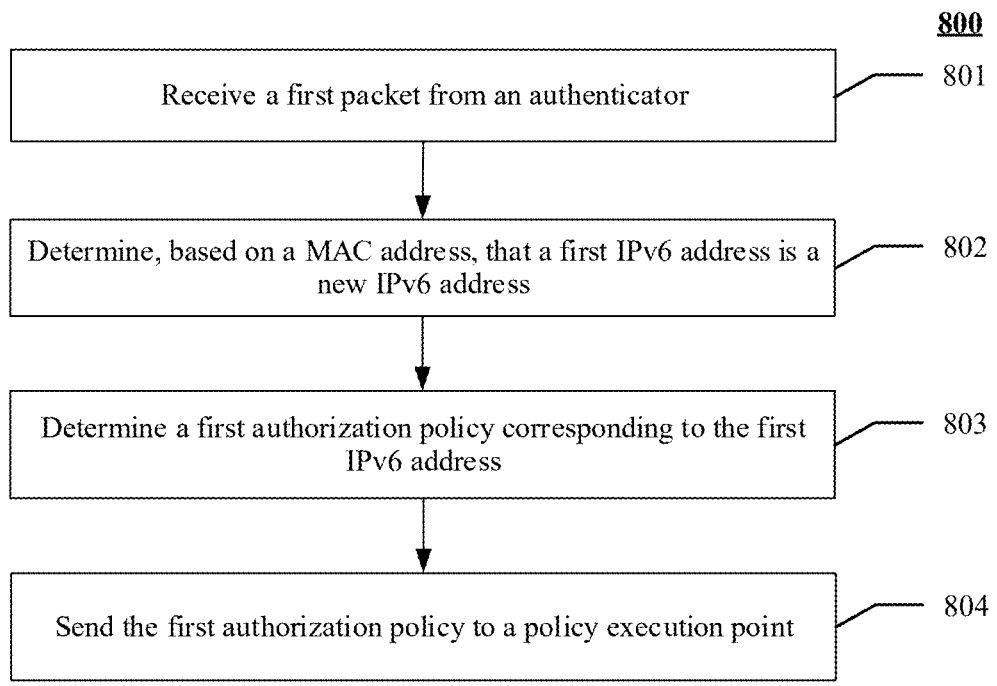
FIG. 8 is another flowchart of an access management method according to an embodiment of this application.

FIG. 8 shows an access management method 800 according to this application. The method 800 is performed by an authenticator server. The access management method 800 may be applied to operations performed by the authentication server in the method 300 described in the embodiment corresponding to FIG. 3 and the method 400 described in the embodiment corresponding to FIG. 4. After a terminal device completes access authentication, the access management method 800 includes the following operations.

Operation 801: Receive a first packet from an authenticator.

The first packet includes a first IPV6 address of the terminal device and a MAC address of the terminal device, and the first IPV6 address is a new temporary IPv6 address of the terminal device.

The first packet in the method 800 may correspond to the packet 2 in the method 300; the first IPV6 address in the method 800 may correspond to the IPV6 address 1 in the method 300; the first MAC address in the method 800 may correspond to the MAC address 1 in the method 300.

Alternatively, the first packet in the method 800 may correspond to the packet 2 in the method 400; the first IPV6 address in the method 800 may correspond to the IPV6 address 1 in the method 400; the first MAC address in the method 800 may correspond to the MAC address 1 in the method 400.

Operation 802: Determine, based on the MAC address, that the first IPv6 address is a new IPv6 address.

In an implementation, before receiving the first packet, the authentication server does not store a correspondence between the MAC address and the first IPV6 address.

In another implementation, the first packet indicates that the first IPV6 address is a new IPv6 address.

In another implementation, the first packet includes first indication information, and the first indication information indicates that the first IPV6 address is a new IPV6 address.

In an implementation, the first indication information further indicates the authentication server to determine the first authorization policy based on the first IPV6 address.

The first indication information in the method 800 may correspond to the indication information 2 in the method 300; the first authorization policy in the method 800 may correspond to the authorization policy 1 in the method 300.

Operation 803: Determine the first authorization policy corresponding to the first IPv6 address.

Operation 804: Send the first authorization policy to a policy enforcement point.

In an implementation, after the receiving a first packet, the method further includes:
  storing the correspondence between the MAC address and the first IPV6 address.

In an implementation, before receiving the first packet, the authentication server stores a correspondence between the MAC address and at least one IPV6 address, the MAC address is in a one-to-one correspondence with each of the at least one IPV6 address, and the at least one IPV6 address is an IPV6 address that has been used before the terminal device uses the first IPV6 address.

In an implementation, the authentication server stores a first correspondence table, and the first correspondence table stores the correspondence between the MAC address and the first IPv6 address.

The first correspondence table in the method 800 may correspond to the correspondence table 3 in the method 300 or the method 400.

In an implementation, the authentication server stores a first correspondence table, and the first correspondence table stores the correspondence between the MAC address and the at least one IPv6 address.

In an implementation, before receiving the first packet, the authentication server stores a correspondence between the MAC address and user information.

In an implementation, the authentication server stores a second correspondence table, where the second correspondence table stores the correspondence between the MAC address and the user information.

The first correspondence table in the method 800 may correspond to the correspondence table 4 in the method 300 or the method 400.

In an implementation, the authentication server stores a second correspondence table, where the second correspondence table stores the correspondence between the MAC address and the user information.

In an implementation, the second correspondence table further includes the correspondence between the MAC address and the first IPV6 address. It may also be understood that the second correspondence table includes the first correspondence table.

In an implementation, the user information includes a user identifier. The user identifier may be information that can uniquely identify a user, such as a user identity number or a user name.

In an implementation, the user information includes an access permission of the user.

In an implementation, before receiving the first packet, the authentication server stores a correspondence between the user identifier and the access permission.

In an implementation, the authentication server stores a second correspondence table, where the second correspondence table stores the correspondence between the user identifier and the access permission.

In an implementation, the user information includes user status information.

In an implementation, after the determining, based on the MAC address, that the first IPv6 address is a new IPV6 address, and before the sending the first authorization policy corresponding to the first IPV6 address to a policy enforcement point, the method further includes: determining that a user corresponding to the first IPV6 address is online.

In an implementation, determining, based on the user status information, that the user is online includes: determining the user identifier based on the MAC address; and determining the user status information based on the user identifier.

In an implementation, the determining the first authorization policy corresponding to the first IPV6 address includes: determining, based on the MAC address, an access permission of the user corresponding to the first IPV6 address; and determining the first authorization policy based on the first IPV6 address and the access permission.

In an implementation, the determining the first authorization policy corresponding to the first IPV6 address includes: determining, based on the MAC address, a user identifier of the user corresponding to the first IPV6 address; determining an access permission of the user based on the user identifier; and determining the first authorization policy based on the first IPV6 address and the access permission.

In an implementation, the first packet is not an authentication request packet.

In an implementation, the first packet is an accounting packet.

In an implementation, the method further includes: receiving a second packet from the authenticator, where the second packet includes a second IPV6 address and second indication information, the second indication information indicates that the second IPV6 address is an invalid IPV6 address, and the second IPV6 address is one of a plurality of IPV6 addresses of the terminal device; and sending a first revocation indication to the policy enforcement point, where the first revocation indication indicates the policy enforcement point to revoke an authorization policy corresponding to the second IPV6 address, and the first revocation indication carries the second IPv6 address.

The second IPV6 address in the method 800 may correspond to the IPV6 address 2 in the method 500; the second packet in the method 800 may correspond to the packet 3 in the method 500; the second indication information in the method 800 may correspond to the indication information 2 in the method 500; the revocation indication in the method 800 may correspond to the revocation indication 1 in the method 500.

In an implementation, the second indication information further indicates the authentication server to revoke the authorization policy corresponding to the second IPV6 address.

In an implementation, the method further includes: receiving a third packet from the authenticator, where the third packet includes third indication information, the third indication information indicates that a user using the terminal device and corresponding to a third IPV6 address is offline, and the third IPV6 address is an IPV6 address finally used by the terminal device; and sending a second revocation indication to the policy enforcement point, where the second revocation indication indicates the policy enforcement point to revoke authorization policies corresponding to all IPv6 addresses of the user corresponding to the third IPV6 address.

The third IPV6 address in the method 800 may correspond to the IPV6 address 1 in the method 600; the third packet in the method 800 may correspond to the packet 4 in the method 600; the third indication information in the method 800 may correspond to the indication information 2 in the method 600; the revocation indication in the method 800 may correspond to the revocation indication 2 in the method 600; the user in the method 800 may correspond to the user A in the method 600.

In an implementation, the third indication information further indicates the authentication server to revoke the authorization policies corresponding to all the IPV6 addresses corresponding to the user corresponding to the third IPV6 address.

In an implementation, the third packet includes at least one of the following: a user identifier corresponding to the third IPV6 address; a MAC address corresponding to the third IPV6 address; or all the IPV6 addresses corresponding to the user corresponding to the third IPV6 address.

In an implementation, the revocation indication carries the all IPV6 addresses corresponding to the user corresponding to the third IPV6 address.

In an implementation, the policy enforcement point is the authenticator.

In an implementation, before the receiving, by the authentication server, a first packet from an authenticator, the method further includes: receiving a fourth packet from the authenticator, where the fourth packet includes a fourth IPV6 address of the terminal device and the MAC address; determining, based on the MAC address, that the fourth IPV6 address is a new IPV6 address; determining a second authorization policy corresponding to the fourth IPV6 address; and sending the second authorization policy to the policy enforcement point.

The fourth packet in the method 800 may correspond to the packet encapsulating the temporary IPV6 address 0 and the MAC address 1 in operation 211 in the method 200, where the fourth IPv6 address corresponds to the temporary IPV6 address 0, and the MAC address corresponds to the MAC address 1.

In an implementation, the determining a second authorization policy corresponding to the fourth IPV6 address includes: determining an access permission of the user based on the correspondence between the MAC address and the access permission of the user; and determining, based on the access permission of the user, the second authorization policy corresponding to the fourth IPV6 address.

The second authorization policy in the method 800 may correspond to the authorization policy 0 in the method 200.

In an implementation, the fourth packet is an authentication request packet.

In this embodiment, when receiving the first packet that is from the terminal device and that carries the first IPV6 address and the MAC address, the authenticator sends the first IPV6 address and the MAC address to the authentication server when determining that the first IPV6 address is a new IPV6 address. Then, the authentication server determines, based on the first IPV6 address, the first authorization policy sent to the policy enforcement point (that is, a gateway). The first authorization policy sent by the authentication server is determined based on the first IPV6 address (that is, the new IPV6 address). Therefore, after the policy enforcement point receives the first authorization policy, a service packet of the terminal device can be transmitted, through the policy enforcement point, to an address or a network segment that allows the user to access. Therefore, even if the IPV6 address of the terminal device changes, the service is not interrupted.

Figure 9:
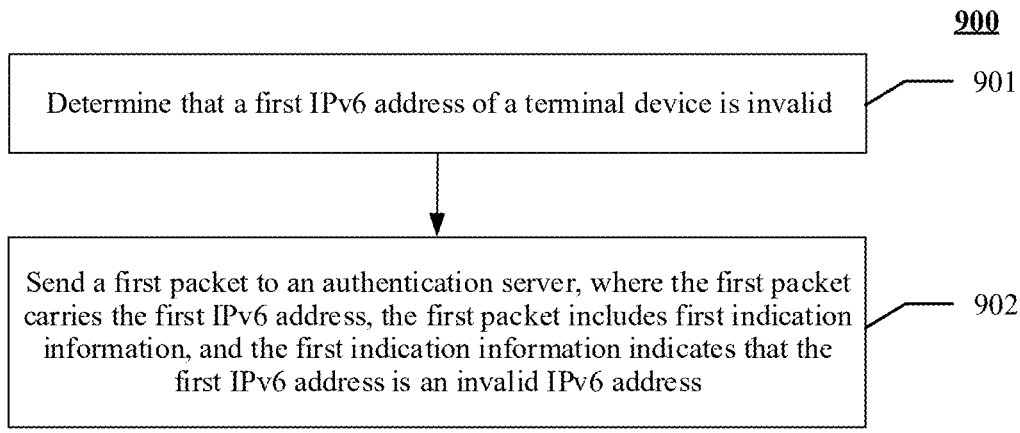
FIG. 9 is another flowchart of an access management method according to an embodiment of this application.

FIG. 9 shows an access management method 900 according to this application. The method 900 is performed by an authenticator. The access management method 900 may be applied to operations performed by the authenticator in the method 300 described in the embodiment corresponding to FIG. 3 and the method 400 described in the embodiment corresponding to FIG. 4. The access management method 900 includes the following operations.

Operation 901: Determine that a first IPV6 address in a plurality of IPV6 addresses of a terminal device is invalid.

Operation 902: Send a first packet to an authentication server.

The first packet carries the first IPV6 address, the first packet includes first indication information, and the first indication information indicates that the first IPV6 address is an invalid IPv6 address.

The first IPV6 address in the method 900 may correspond to the temporary IPV6 address 2 in the method 500; the first packet in the method 900 may correspond to the packet 3 in the method 500; the first indication information in the method 900 may correspond to the indication information 1 in the method 500.

In an implementation, the first indication information further indicates the authentication server to revoke an authorization policy corresponding to the first IPV6 address.

In an implementation, before the sending a first packet to an authentication server, the method further includes: sending a snooping packet, where a destination address of the snooping packet is the first IPV6 address; and in response to a fact that no response packet from the first IPV6 address for the snooping packet is received, determining that the first IPV6 address is invalid.

The snooping packet in the method 900 may correspond to the snooping packet 1 in the method 500; the response packet in the method 900 may correspond to the response packet 1 in the method 500.

In an implementation, the method further includes: determining that a second IPV6 address in a plurality of IPV6 addresses of the terminal device is invalid; and sending a second packet to the authentication server, where the first packet includes the second IPV6 address and second indication information, and the second indication information indicates that the second IPv6 address is an invalid IPV6 address.

Figure 10:
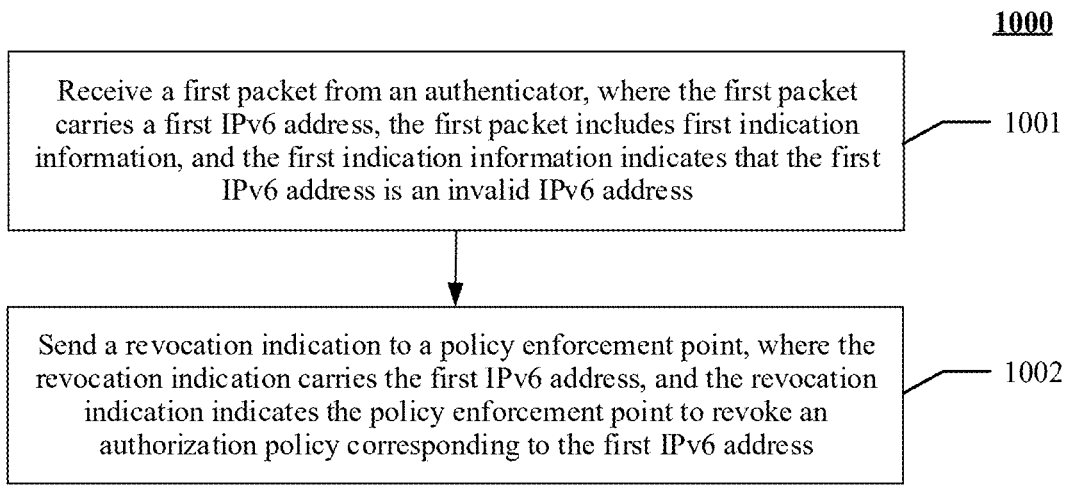
FIG. 10 is another flowchart of an access management method according to an embodiment of this application.

FIG. 10 shows an access management method 1000 according to this application. The method 1000 is performed by an authenticator server. The access management method 1000 may be applied to operations performed by the authentication server in the method 300 described in the embodiment corresponding to FIG. 3 and the method 400 described in the embodiment corresponding to FIG. 4. The authentication server stores a correspondence among the plurality of IPV6 addresses of the terminal device, a MAC address of the terminal device, and an access permission of a user using the terminal device. The access management method 1000 includes the following operations.

Operation 1001: Receive a first packet from an authenticator.

The first packet includes a first IPV6 address in the plurality of IPV6 addresses of the terminal device and first indication information, and the first indication information indicates that the first IPv6 address is an invalid IPV6 address.

The first IPV6 address in the method 1000 may correspond to the temporary IPV6 address 2 in the method 500; the first packet in the method 1000 may correspond to the packet 3 in the method 500; the first indication information in the method 1000 may correspond to the indication information 1 in the method 500.

Operation 1002: Send a first revocation indication to a policy enforcement point.

The first revocation indication carries the first IPV6 address, and the first revocation indication indicates the policy enforcement point to revoke an authorization policy corresponding to the first IPV6 address.

The first revocation indication in the method 900 may correspond to the revocation indication 1 in the method 500.

In an implementation, the first indication information further indicates the authentication server to revoke the authorization policy corresponding to the first IPv6 address.

In an implementation, the method further includes: receiving a second packet from the authenticator, where the second packet carries a second IPV6 address, the second packet includes second indication information, and the second indication information indicates that the second IPV6 address is an invalid IPV6 address; and sending a second revocation indication to the policy enforcement point, where the second revocation indication carries the second IPV6 address, and the second revocation indication indicates the policy enforcement point to revoke an authorization policy corresponding to the second IPV6 address.

Figure 11:
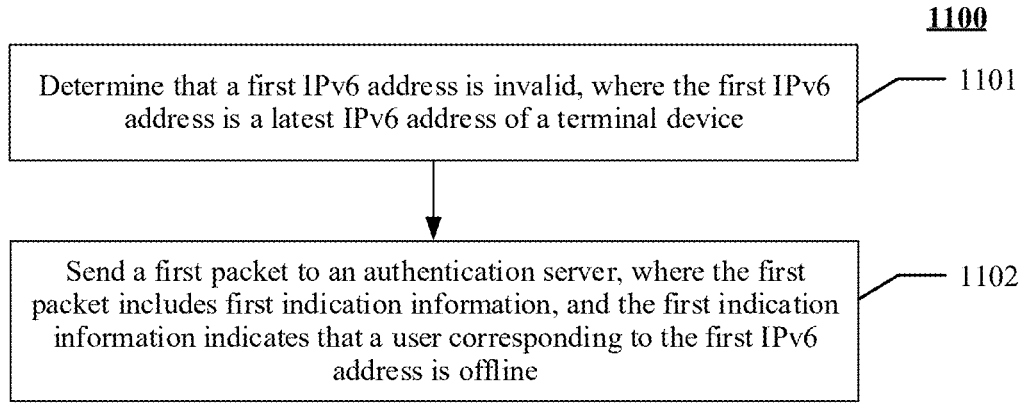
FIG. 11 is another flowchart of an access management method according to an embodiment of this application.

FIG. 11 shows an access management method 1100 according to this application. The method 1100 is performed by an authenticator. The access management method 1100 may be applied to operations performed by the authenticator in the method 300 described in the embodiment corresponding to FIG. 3 and the method 400 described in the embodiment corresponding to FIG. 4. The access management method 1100 includes the following operations.

Operation 1101: Determine that a first IPV6 address in a plurality of IPV6 addresses of a terminal device is invalid.

The first IPV6 address is an IPV6 address finally used by the terminal device.

Operation 1102: Send a first packet to an authentication server.

The first packet includes first indication information, and the first indication information indicates that a user using the terminal device and corresponding to the first IPV6 address is offline.

The first IPV6 address in the method 1100 may correspond to the temporary IPV6 address 1 in the method 600; the first packet in the method 1100 may correspond to the packet 4 in the method 600; the first indication information in the method 1100 may correspond to the indication information 2 in the method 600.

In an implementation, the first indication information further indicates the authentication server to revoke authorization policies corresponding to all IPV6 addresses corresponding to the user.

In an implementation, the first packet includes at least one of the following: a user identifier corresponding to the first IPV6 address; a MAC address corresponding to the first IPV6 address; or all the IPV6 addresses corresponding to the user corresponding to the first IPV6 address.

In an implementation, the determining that a first IPV6 address in a plurality of IPV6 addresses of a terminal device is invalid includes: sending a snooping packet, where a destination address of the snooping packet is the first IPV6 address; and in response to a fact that no response packet from the first IPV6 address for the snooping packet is received, determining that the first IPv6 address is invalid.

The snooping packet in the method 1100 may correspond to the snooping packet 1 in the method 500; the response packet in the method 1100 may correspond to the response packet 1 in the method 500.

Figure 12:
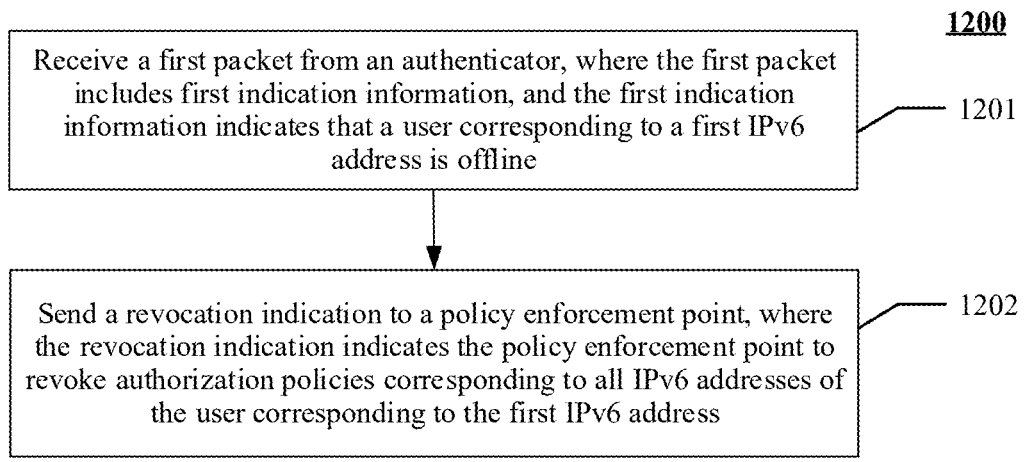
FIG. 12 is another flowchart of an access management method according to an embodiment of this application.

FIG. 12 shows an access management method 1200 according to this application. The method 1200 is performed by an authenticator server. The access management method 1200 may be applied to operations performed by the authentication server in the method 300 described in the embodiment corresponding to FIG. 3 and the method 400 described in the embodiment corresponding to FIG. 4. The authentication server stores a correspondence among a plurality of IPV6 addresses of a terminal device, a MAC address of the terminal device, and an access permission of a user using the terminal device. The access management method 1200 includes the following operations.

Operation 1201: Receive a first packet from an authenticator.

The first packet includes first indication information, the first indication information indicates that a user using the terminal device and corresponding to a first IPV6 address is offline, and the first IPV6 address is an IPV6 address finally used by the terminal device.

Operation 1202: Send a revocation indication to a policy enforcement point.

The revocation indication indicates the policy enforcement point to revoke authorization policies corresponding to all IPV6 addresses of the user corresponding to the first IPv6 address.

The first IPV6 address in the method 1200 may correspond to the temporary IPV6 address 1 in the method 600; the first packet in the method 1200 may correspond to the packet 4 in the method 600; the first indication information in the method 1200 may correspond to the indication information 2 in the method 600; the revocation indication in the method 1200 may correspond to the revocation indication 2 in the method 600.

In an implementation, the first indication information further indicates the authentication server to revoke the authorization policies corresponding to all the IPV6 addresses corresponding to the user corresponding to the first IPV6 address.

In an implementation, the first packet includes at least one of the following: a user identifier of the user corresponding to the first IPV6 address; a MAC address corresponding to the first IPV6 address; or all the IPV6 addresses of the user corresponding to the first IPV6 address.

In an implementation, the revocation indication carries all the IPV6 addresses of the user corresponding to the first IPV6 address.

Figure 13:
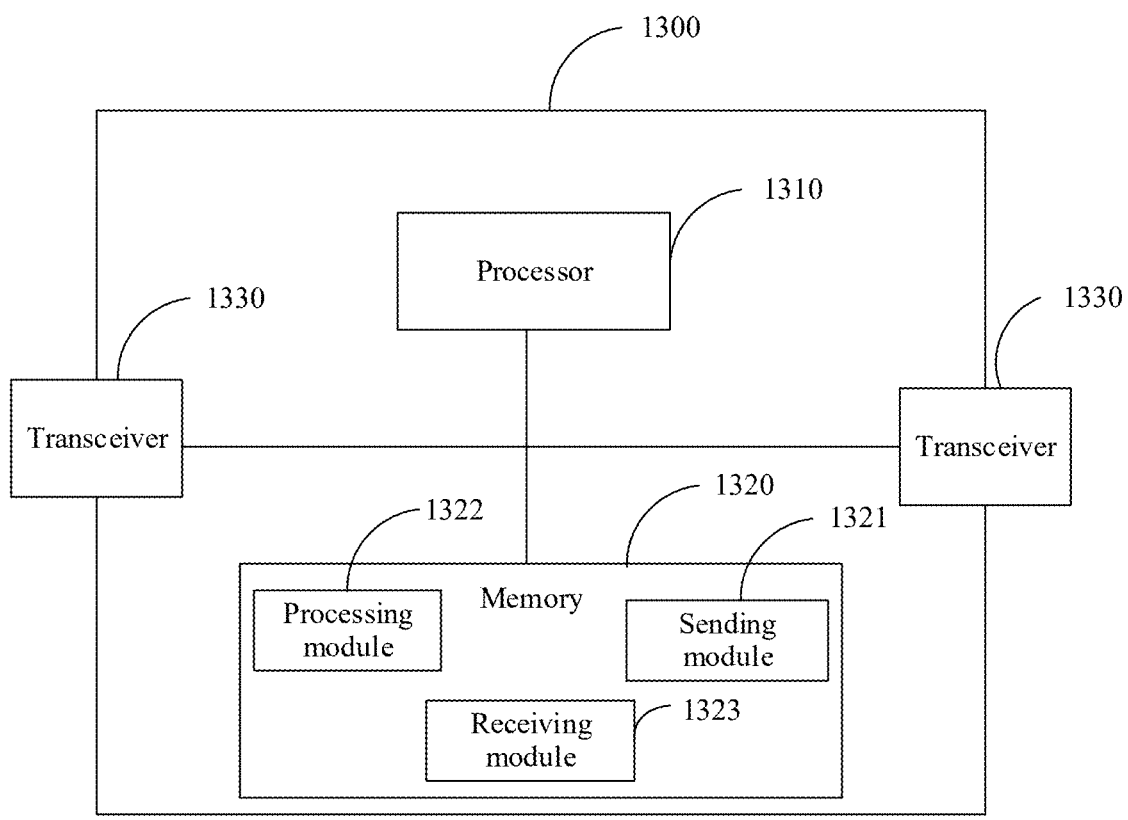
FIG. 13 is a schematic diagram of a communication apparatus according to an embodiment of this application.

In addition, an embodiment of this application further provides a communication apparatus 1300. FIG. 13 is a schematic structural diagram of a communication apparatus according to an embodiment of this application.

The communication apparatus 1300 may be configured to perform the method 200, the method 300, the method 400, the method 500, the method 600, the method 700, the method 800, the method 900, the method 1000, the method 1100, or the method 1200 in the foregoing embodiments.

As shown in FIG. 13, the communication apparatus 1300 may include a processor 1310, a memory 1320, and a transceiver 1330. The processor 1310 is coupled to the memory 1320, and the processor 1310 is coupled to the transceiver 1330.

The transceiver 1330 may also be referred to as a transceiver unit, a transceiver, a transceiver apparatus, or the like. In an embodiment, a component that is configured to implement a receiving function and that is in the transceiver unit may be considered as a receiving unit, and a component that is configured to implement a sending function and that is in the transceiver unit may be considered as a sending unit. In other words, the transceiver unit includes the receiving unit and the sending unit. The receiving unit may also be referred to as a receiver, an input port, a receiving circuit, or the like. The sending unit may be referred to as a transmitter, a transmitting circuit, or the like. For example, the transceiver 1330 may be an optical module.

The processor 1310 may be a central processing unit (CPU), a network processor (NP), a combination of a CPU and an NP, or the like. The processor may alternatively be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 1310 may be one processor, or may include a plurality of processors.

In addition, the memory 1320 is mainly configured to store a software program and data. The memory 1320 may exist independently, and is connected to the processor 1310. In an embodiment, the memory 1320 may be integrated with the processor 1310, for example, integrated into one or more chips. The memory 1320 can store program code for executing the technical solutions in embodiments of this application, and the processor 1310 controls the execution. Various types of executed computer program code may also be considered as drivers of the processor 1310. The memory 1320 may include a volatile memory, for example, a random access memory (RAM). The memory may include a non-volatile memory, for example, a read-only memory (ROM), a flash memory, a hard disk drive (HDD), or a solid-state drive (SSD). The memory 1320 may further include a combination of the foregoing types of memories. The memory 1320 may be one memory, or may include a plurality of memories.

In an implementation, the memory 1320 stores computer-readable instructions. The computer-readable instructions include a plurality of software modules, for example, a sending module 1321, a processing module 1322, and a receiving module 1323. After executing each software module, the processor 1310 may perform a corresponding operation as indicated by each software module. In this embodiment, an operation performed by a software module is actually the operation performed by the processor 1310 based on the indication of the software module.

It should be understood that the authenticator in the method embodiments corresponding to FIG. 2A and FIG. 2B, FIG. 3, FIG. 4, FIG. 5, FIG. 6, FIG. 7, FIG. 8, FIG. 9, FIG. 10, FIG. 11, and FIG. 12 may all be based on the structure of the communication apparatus 1300 shown in FIG. 13 in this embodiment.

For example, when the communication apparatus 1300 is configured to perform the method 300 in the foregoing embodiment, the receiving module 1323 is configured to receive a packet 1 from a terminal device. The sending module 1321 is configured to send a packet 2 to an authentication server. The processing module 1322 is configured to: determine that a temporary IPV6 address 1 is a new temporary IPV6 address; and determine that a user corresponding to the temporary IPv6 address 1 is online.

For example, when the communication apparatus 1300 is configured to perform the method 500 in the foregoing embodiment, the sending module 1321 is configured to: send a snooping packet 1 to a temporary IPV6 address 2, and send a packet 3 to the authentication server. The processing module 1322 is configured to: when no response packet for the snooping packet 1 exists, determine that the temporary IPV6 address 2 is invalid.

For example, when the communication apparatus 1300 is configured to perform the method 600 in the foregoing embodiment, the sending module 1321 is configured to: send a snooping packet 2 to the temporary IPV6 address 1, and send a packet 4 to the authentication server. The processing module 1322 is configured to: when no response packet for the snooping packet 2 exists, determine that a user corresponding to the temporary IPV6 address 1 is offline.

For other details, refer to the method of the authenticator in the foregoing embodiments, and details are not described herein again.

It should be further understood that the authentication server in the method embodiments corresponding to FIG. 2A and FIG. 2B, FIG. 3, FIG. 4, FIG. 5, FIG. 6, FIG. 7, FIG. 8, FIG. 9, FIG. 10, FIG. 11, and FIG. 12 may also be based on the structure of the communication apparatus 1300 shown in FIG. 13 in this embodiment.

For example, when the communication apparatus 1300 is configured to perform the method 300 in the foregoing embodiment, the receiving module 1323 is configured to receive a packet 2 from the authenticator. The sending module 1321 is configured to send an authorization policy 1 to a policy enforcement point. The processing module 1322 is configured to: store the temporary IPV6 address 1 and the MAC address 1 in correspondence with each other; and determine the authorization policy 1 corresponding to the temporary IPV6 address 1.

For example, when the communication apparatus 1300 is configured to perform the method 400 in the foregoing embodiment, the processing module 1322 is further configured to determine that a user corresponding to the temporary IPV6 address 1 is online.

For example, when the communication apparatus 1300 is configured to perform the method 500 in the foregoing embodiment, the receiving module 1323 is configured to receive a packet 3 from the authenticator. The sending module 1321 sends a revocation indication 1 to the policy enforcement point, and sends a revocation indication 2 to the policy enforcement point. The processing module 1322 is configured to: determine whether the temporary IPV6 address 2 is a latest temporary IPv6 address; and determine all temporary IPv6 addresses of a user corresponding to the temporary IPV6 address 2.

For example, when the communication apparatus 1300 is configured to perform the method 600 in the foregoing embodiment, the receiving module 1323 is configured to receive a packet 4 from the authenticator. The sending module 1321 sends a revocation indication 2 to the policy enforcement point. The processing module 1322 is configured to: determine whether the temporary IPV6 address 1 is a latest temporary IPV6 address; and determine all temporary IPV6 addresses of a user corresponding to the temporary IPV6 address 1.

For other details, refer to the methods of the authentication server in the foregoing embodiments, and details are not described herein again.

Figure 14:
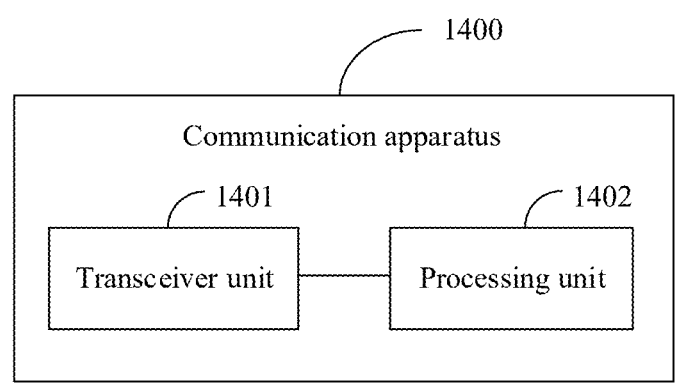
FIG. 14 is a schematic diagram of another communication apparatus according to an embodiment of this application.

In addition, an embodiment of this application further provides a communication apparatus 1400, as shown in FIG. 14. FIG. 14 is a schematic structural diagram of a communication apparatus according to an embodiment of this application. The communication apparatus 1400 includes a transceiver unit 1401 and a processing unit 1402. The communication apparatus 1400 may be configured to perform the method 200, the method 300, the method 400, the method 500, the method 600, the method 700, the method 800, the method 900, the method 1000, the method 1100, or the method 1200 in the foregoing embodiments.

In an example, the communication apparatus 1400 may perform the method 300 in the foregoing embodiment. When the communication apparatus 1400 is configured to perform the method 300 in the foregoing embodiment, the communication apparatus 1400 is equivalent to the authenticator in the method 300. The transceiver unit 1401 is configured to perform receiving and sending operations performed by the authenticator in the method 300. The processing unit 1402 is configured to perform an operation other than the receiving and sending operations performed by the authenticator in the method 300. For example, the transceiver unit 1401 is configured to: receive a packet 1 from a terminal device, and send a packet 2 to an authentication server. The processing unit 1402 is configured to: determine that a temporary IPV6 address 1 is a new temporary IPV6 address, and determine that a user corresponding to the temporary IPV6 address 1 is online.

In an example, the communication apparatus 1400 may perform the method 300 in the foregoing embodiment. When the communication apparatus 1400 is configured to perform the method 300 in the foregoing embodiment, the communication apparatus 1400 is equivalent to the authentication server in the method 300. The transceiver unit 1401 is configured to perform receiving and sending operations performed by the authentication server in the method 300. The processing unit 1402 is configured to perform an operation other than the receiving and sending operations performed by the authentication server in the method 140. For example, the transceiver unit 1401 is configured to: receive a packet 2 from an authenticator, and send an authorization policy 1 to a policy enforcement point. The processing unit 1402 is configured to: store the temporary IPV6 address 1 and a MAC address 1 in correspondence with each other; and determine the authorization policy 1 corresponding to the temporary IPv6 address 1.

In an example, the communication apparatus 1400 may perform the method 500 in the foregoing embodiment. When the communication apparatus 1400 is configured to perform the method 500 in the foregoing embodiment, the communication apparatus 1400 is equivalent to the authenticator in the method 500. The transceiver unit 1401 is configured to perform receiving and sending operations performed by the authenticator in the method 500. The processing unit 1402 is configured to perform an operation other than the receiving and sending operations performed by the authenticator in the method 500. For example, the transceiver unit 1401 is configured to: send a snooping packet 1 to a temporary IPV6 address 2, and send a packet 3 to an authentication server. The processing unit 1402 is configured to: when no response packet for the snooping packet 1 exists, determine that the temporary IPV6 address 2 is invalid.

In an example, the communication apparatus 1400 may perform the method 500 in the foregoing embodiment. When the communication apparatus 1400 is configured to perform the method 500 in the foregoing embodiment, the communication apparatus 1400 is equivalent to the authentication server in the method 500. The transceiver unit 1401 is configured to perform receiving and sending operations performed by the authentication server in the method 500. The processing unit 1402 is configured to perform an operation other than the receiving and sending operations performed by the authentication server in the method 140. For example, the transceiver unit 1401 is configured to: receive a packet 3 from an authenticator; send a revocation indication 1 to a policy enforcement point; and send a revocation indication 2 to the policy enforcement point. The processing unit 1402 is configured to: determine whether the temporary IPv6 address 2 is a latest temporary IPV6 address; and determine all temporary IPv6 addresses of a user corresponding to the temporary IPV6 address 2.

In an example, the communication apparatus 1400 may perform the method 600 in the foregoing embodiment. When the communication apparatus 1400 is configured to perform the method 600 in the foregoing embodiment, the communication apparatus 1400 is equivalent to the authenticator in the method 600. The transceiver unit 1401 is configured to perform receiving and sending operations performed by the authenticator in the method 600. The processing unit 1402 is configured to perform an operation other than the receiving and sending operations performed by the authenticator in the method 600. For example, the transceiver unit 1401 is configured to: send a snooping packet 2 to a temporary IPV6 address 1, and send a packet 4 to an authentication server. The processing unit 1402 is configured to: when no response packet for the snooping packet 2 exists, determine that a user corresponding to the temporary IPV6 address 1 is offline.

In an example, the communication apparatus 1400 may perform the method 600 in the foregoing embodiment. When the communication apparatus 1400 is configured to perform the method 600 in the foregoing embodiment, the communication apparatus 1400 is equivalent to the authentication server in the method 600. The transceiver unit 1401 is configured to perform receiving and sending operations performed by the authentication server in the method 600. The processing unit 1402 is configured to perform an operation other than the receiving and sending operations performed by the authentication server in the method 140. For example, the transceiver unit 1401 is configured to: receive a packet 4 from an authenticator, and send a revocation indication 2 to a policy enforcement point. The processing unit 1402 is configured to: determine whether the temporary IPV6 address 2 is a latest temporary IPV6 address; determine whether the temporary IPV6 address 1 is a latest temporary IPV6 address; and determine all temporary IPv6 addresses of a user corresponding to the temporary IPV6 address 1.

In addition, an embodiment of this application further provides a communication system. The communication system includes an authenticator and an authentication server. In an embodiments, the communication system further includes a terminal device. Structures of the authenticator and the authentication server may be the structures shown in FIG. 13 or FIG. 14. The authenticator is configured to perform the method of the authenticator in the foregoing embodiments corresponding to FIG. 2A and FIG. 2B, FIG. 3, FIG. 4, FIG. 5, FIG. 6, FIG. 7, FIG. 8, FIG. 9, FIG. 10, FIG. 11, and FIG. 12. The authentication server is configured to perform the method of the authentication server in the foregoing embodiments corresponding to FIG. 2A and FIG. 2B, FIG. 3, FIG. 4, FIG. 5, FIG. 6, FIG. 7, FIG. 8, FIG. 9, FIG. 10, FIG. 11, and FIG. 12.

In an implementation process, operations in the foregoing methods can be implemented by using a hardware integrated logical circuit in the processor, or by using instructions in a form of software. The operations of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor. To avoid repetition, details are not described herein again. It should be further understood that, "first", "second", "third", "fourth", and various numbers in this specification are merely used for differentiation for ease of description, and are not intended to limit the scope of embodiments of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A method of access management, the method comprising:
    at an authenticator:
    in response to a terminal device completing access authentication, receiving a first packet sent by the terminal device, wherein the first packet comprises a first Internet Protocol version 6 (IPv6) address of the terminal device and a Media Access Control (MAC) address of the terminal device, the first IPV6 address is a new temporary IPV6 address of the terminal device, the authenticator stores the MAC address, and the first IPV6 address does not exist in one or more temporary IPv6 addresses corresponding to the MAC address; and
    in response to determining that the first IPV6 address is a new IPV6 address, sending a second packet to an authentication server, wherein the second packet comprises the first IPV6 address and the MAC address, and wherein the second packet further comprises instructions for the authentication server to determine a first authorization policy based on the first IPV6 address, and the first authorization policy comprises an access permission of the terminal device corresponding to the first IPV6 address.

2. The method according to claim 1, wherein the authenticator does not store a correspondence between the MAC address and the first IPV6 address before receiving the first packet.

3. The method according to claim 1, wherein before receiving the first packet, the method further comprises the authenticator storing a correspondence between the MAC address and at least one IPV6 address, and wherein the at least one IPV6 address is an IPV6 address that is being used, or has been used, by the terminal device before the terminal device sends the first packet.

4. The method according to claim 1, wherein before sending the second packet, the method further comprises:
    determining that a user corresponding to the first IPv6 address is online.

5. The method according to claim 1, wherein the second packet indicates that the first IPv6 address is a new IPV6 address.

6. The method according to claim 5, wherein the second packet comprises first indication information, and the first indication information indicates that the first IPV6 address is a new IPV6 address.

7. The method according to claim 1, wherein the second packet is not an authentication request packet.

8. The method according to claim 1, wherein the method further comprises:
    in response to a second IPV6 address in a plurality of IPV6 addresses of the terminal device being invalid, sending a third packet to the authentication server, wherein the third packet comprises the second IPv6 address and second indication information, and the second indication information indicating that the second IPV6 address is an invalid IPV6 address, or the second indication information including instructions for the authentication server to revoke an authorization policy corresponding to the second IPV6 address.

9. An apparatus for implementing access management, the apparatus comprising:
    at least one processor, at an authenticator; and
    a memory, coupled to the at least one processor and having executable instructions stored thereon that when executed by the at least one processor cause the apparatus to:
    in response to a terminal device completing access authentication, receive a first packet sent by the terminal device, wherein the first packet comprises a first IPv6 address of the terminal device and a MAC address of the terminal device, the first IPv6 address is a new temporary IPV6 address of the terminal device, the authenticator stores the MAC address, and the first IPv6 address does not exist in one or more temporary IPV6 addresses corresponding to the MAC address; and
    in response to determining that the first IPV6 address is a new IPV6 address, send a second packet to an authentication server, wherein the second packet comprises the first IPV6 address and the MAC address, and wherein the second packet further comprises instructions for the authentication server to determine a first authorization policy based on the first IPV6 address, and the first authorization policy comprises an access permission of the terminal device corresponding to the first IPV6 address.

10. The apparatus according to claim 9, wherein a correspondence between the MAC address and the first IPV6 address is not stored in the authenticator before receiving the first packet.

11. The apparatus according to claim 9, wherein a correspondence between the MAC address and at least one IPV6 address is stored in the authenticator before receiving the first packet, and the at least one IPV6 address is an IPV6 address that is being used or has been used by the terminal device before the terminal device sends the first packet.

12. The apparatus according to claim 9, wherein the second packet indicates that the first IPV6 address is a new IPV6 address.

13. The apparatus according to claim 9, wherein the second packet is not an authentication request packet.

14. The apparatus according to claim 9, wherein the apparatus is further caused to:
    in response to a second IPV6 address in a plurality of IPV6 addresses of the terminal device being invalid, send a third packet to the authentication server, wherein the third packet comprises the second IPV6 address and second indication information, and the second indication information indicates that the second IPv6 address is an invalid IPV6 address or the second indication information includes instructions for the authentication server to revoke an authorization policy corresponding to the second IPV6 address.

15. A non-transitory machine-readable medium having instructions stored therein, which when executed by a processor, cause the processor to:

in response to a terminal device completing access authentication, receive a first packet sent by the terminal device, wherein the first packet comprises a first IPV6 address of the terminal device and a MAC address of the terminal device, the first IPV6 address is a new temporary IPV6 address of the terminal device, the authenticator stores the MAC address, and the first IPV6 address does not exist in one or more temporary IPV6 addresses corresponding to the MAC address; and in response to determining that the first IPV6 address is a new IPV6 address, send a second packet to an authentication server, wherein the second packet comprises the first IPV6 address and the MAC address, and wherein the second packet further comprises instructions for the authentication server to determine a first authorization policy based on the first IPV6 address, and the first authorization policy comprises an access permission of the terminal device corresponding to the first IPV6 address.

16. The non-transitory machine-readable medium according to claim 15, wherein a correspondence between the MAC address and the first IPV6 address is not stored in an authenticator before receiving the first packet.

17. The non-transitory machine-readable medium according to claim 15, wherein a correspondence between the MAC address and at least one IPV6 address is stored in the authenticator before receiving the first packet, and the at least one IPV6 address is an IPV6 address that is being used or has been used by the terminal device before the terminal device sends the first packet.

18. The non-transitory machine-readable medium according to claim 15, wherein the second packet indicates that the first IPV6 address is a new IPV6 address.

\* \* \* \* \*